US012491176B2

(12) United States Patent
Mor et al.

(10) Patent No.: US 12,491,176 B2
(45) Date of Patent: Dec. 9, 2025

(54) METHODS, COMPOSITIONS, KITS AND USES THEREOF TARGETING AND/OR TREATING VRK2 TO ENHANCE EFFECTIVENESS OF IMMUNE CHECKPOINT INHIBITOR(S)

(71) Applicant: THE TRUSTEES OF COLUMBIA UNIVERSITY IN THE CITY OF NEW YORK, New York, NY (US)

(72) Inventors: Adam Mor, Old Tappan, NJ (US); Michael Peled, Givatayim (IL)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 17/726,120

(22) Filed: Apr. 21, 2022

(65) Prior Publication Data

US 2022/0370408 A1 Nov. 24, 2022

Related U.S. Application Data

(60) Provisional application No. 63/177,594, filed on Apr. 21, 2021.

(51) Int. Cl.
*A61K 31/381* (2006.01)
*A61P 35/00* (2006.01)
*C12Q 1/6886* (2018.01)

(52) U.S. Cl.
CPC ............ *A61K 31/381* (2013.01); *A61P 35/00* (2018.01); *C12Q 1/6886* (2013.01); *C12Q 2600/136* (2013.01); *C12Q 2600/158* (2013.01); *C12Q 2600/178* (2013.01)

(58) Field of Classification Search
CPC ....... A61K 31/38; A61P 35/00; C12Q 1/6886; C12Q 2600/136; C12Q 2600/158; C12Q 2600/178; C12N 2310/14; C12N 2320/31; C12N 15/1137; C12Y 207/11001
See application file for complete search history.

(56) References Cited

U.S. PATENT DOCUMENTS 10,654,929 B2   5/2020  Mabry, III et al.
2019/0091205 A1  3/2019  Stagljar et al.

FOREIGN PATENT DOCUMENTS

| CN | 1990860 A | 7/2007 | |
| KR | 1020130022034 | 3/2013 | |
| WO | WO-2006005778 A1 | 1/2006 | |
| WO | WO-2010149394 A1 | 12/2010 | |
| WO | WO-2014160364 A1 * | 10/2014 | ........... C12Q 1/6886 |

OTHER PUBLICATIONS

Peled et al., 2021, Immunology Letters, 233, 42-47.*
Marta Vázquez-Cedeira, et al. "Differential Inhibitor Sensitivity between Human Kinases VRK1 and VRK2", PLoS One, vol. 6, Issue 8, Aug. 2011.
Ricardo A.M. Serafim, et al. "Development of Pyridine-based Inhibitors for the Human Vaccinia-related Kinases 1 and 2" ACS Medical Chem. Letter, 2019, 10, 9, 1266-1271.
Rafael M. Counago et al. "Structural characterization of human Vaccinia-Related Kinases (VRK) bound to small-molecule inhibitors identifies different P-loop conformations" Scientific Report, 7, article No. 7501 (2017).
H. Dong et al., "B7-H1, a third member of the B7 family, co-stimulates T-cell proliferation and interleukin-10 secretion," Nature medicine 1999, 5(12): 1365-1369.
GL Freeman et al., "Engagement of the PD-1 immunoinhibitory receptor by a novel B7 family member leads to negative regulation of lymphocyte activation," The Journal of experimental medicine 2000, 192(7): 1027-1034.
Y. Latchman, et al., "PD-L2 is a second ligand for PD-1 and inhibits T cell activation," Nature immunology 2001, 2(3): 261-268.
SY Tseng, et al., "B7-DC, a new dendritic cell molecule with potent costimulatory properties for T cells," The Journal of experimental medicine 2001, 193(7): 839-846.
M. Peled, et al., "Affinity purification mass spectrometry analysis of PD-1 uncovers SAP as a new checkpoint inhibitor," Proceedings of the National Academy of Sciences of the United States of America 2018, 115(3): E468-E477.
I. Azoulay-Alfaguter et al., "The coreceptor programmed death 1 inhibits T-cell adhesion by regulating Rap1," The Journal of allergy and clinical immunology 2015, 135(2): 564-567.
JM Chemnitz et al., "SHP-1 and SHP-2 associate with immunoreceptor tyrosine-based switch motif of programmed death 1 upon primary human T cell stimulation, but only receptor ligation prevents T cell activation," Journal of immunology 2004, 173(2): 945-954.
E. Hui, et al., "T cell costimulatory receptor CD28 is a primary target for PD-1-mediated inhibition," Science 2017, 355 (6332): 1428-1433.
N. Patsoukis, et al., "Selective effects of PD-1 on Akt and Ras pathways regulate molecular components of the cell cycle and inhibit T cell proliferation," Science signaling 2012, 5(230): ra46.
KA Sheppard, et al., "PD-1 inhibits T-cell receptor induced phosphorylation of the ZAP70/CD3zeta signalosome and downstream signaling to PKCtheta," FEBS letters 2004, 574(1-3): 37-41.
AS Tocheva, et al., "Quantitative phosphoproteomic analysis reveals involvement of PD-1 in multiple T cell functions," The Journal of biological chemistry 2020.
SD Zabludoff, et al., "AZD7762, a novel checkpoint kinase inhibitor, drives checkpoint abrogation and potentiates DNA-targeted therapies," Molecular cancer therapeutics 2008, 7(9): 2955-2966.
C. King, et al., "LY2606368 Causes Replication Catastrophe and Antitumor Effects through CHK1-Dependent Mechanisms," Molecular cancer therapeutics 2015, 14(9): 2004-2013.

(Continued)

*Primary Examiner* — Sun Jae Yoo
(74) *Attorney, Agent, or Firm* — Wilmer Cutler Pickering Hale and Dorr LLP

(57) ABSTRACT

Exemplary methods, compositions, kits and uses thereof for treating neoplasia are provided. For example, a method can be provided for treating neoplasia in a subject, including administering to the subject a VRK2 (vaccinia-related kinase 2) inhibitor, alone or in combination with an inhibitor of Programmed cell death receptor-1 (PD-1). The exemplary methods, compositions and kits may improve cancer immunotherapy.

36 Claims, 22 Drawing Sheets

Specification includes a Sequence Listing.

(56) References Cited

OTHER PUBLICATIONS

A. Blasina, et al., "Breaching the DNA damage checkpoint via PF-00477736, a novel small-molecule inhibitor of checkpoint kinase 1," Molecular cancer therapeutics 2008, 7(8): 2394-2404.
GA Masters, et al., "Clinical cancer advances 2015: Annual report on progress against cancer from the American Society of Clinical Oncology," Journal of clinical oncology: official journal of the American Society of Clinical Oncology 2015, 33(7): 786-809.
MA Postow, et al., "Immune-Related Adverse Events Associated with Immune Checkpoint Blockade," The New England journal of medicine 2018, 378(2): 158-168.
V. Subbiah, et al., "Dual EGFR blockade with cetuximab and erlotinib combined with anti-VEGF antibody bevacizumab in advanced solid tumors: a phase 1 dose escalation triplet combination trial," Experimental hematology & oncology 2020, 9: 7.
S. Huang, et al., "Dual-agent molecular targeting of the epidermal growth factor receptor (EGFR): combining anti-EGFR antibody with tyrosine kinase inhibitor," Cancer research 2004, 64(15): 5355-5362.
JA Marin-Acevedo, et al., "Next generation of immune checkpoint inhibitors and beyond," Journal of Hematololgy Oncology Mar. 19, 2021; 14(1).
P. Darvin, et al., "Immune checkpoint inhibitors: recent progress and potential biomarkers," Exp Mol Med. Dec. 13, 2018; 50(12): pp. 1-11.
S. Blanco, et al., "The subcellular localization of vaccinia-related kinase-2 (VRK2) isoforms determines their different effect on p53 stability in tumour cell lines," FEBS J. Jun. 2006; 273(11): pp. 2487-2504.
Serafim et al., "Development of Pyridine-based Inhibitors for the Human Vaccinia-related Kinases 1 and 2," ACS Med. Chem. Lett. 2019, 10, 1266-1271.
Vazquez-Cedeira, et al., "Differential Inhibitor Sensitivity between Human Kinases VRK1 and VRK2," PLoS ONE, Aug. 2011, 6(8): pp. e23235.
Couñago et al., "Structural characterization of human Vaccinia-Related Kinases (VRK) bound to small-molecule inhibitors identifies different P-loop conformations," Scientific Reports, Aug. 2017, 7: 7501.
Michael Peled, et al, "VRK2 inhibition synergizes with PD-1 blockade to improve T cell responses," Immunology Letters 233 (2021) 42-47.
Michael Peled, et al., "Data on the identification of VRK2 as a mediator of PD-1 function," Data in Brief 37 (2021) 107168.
Y. Ishida "PD-1: its discovery, involvement in cancer immunotherapy, and beyond," Cells 2020;9:1376. PMCID: 7349669.
C. Pan, et al., "Next-generation immuno-oncology agents: current momentum shifts in cancer immunotherapy," J Hematol Oncol 2020;13:29. PMCID: 7119170.
AS Tocheva, et al., "Quantitative phosphoproteomic analysis reveals involvement of PD-1 in multiple T cell functions," J Biol Chem 2020;295:18036-18050. NIHMSID: 1679597.
M. Peled, et al., "VRK2 inhibition synergizes with PD-1 blockade to improve T cell responses," Immunol Lett 2021; 2478: 45-6.
Y. Kloog, et al., "Cytotoxic T lymphocyte antigen 4 receptor signaling for lymphocyte adhesion is mediated by C3G and Rap1," Mol Cell Biol 2014;34:978-88.
M. Strazza, et al., "CD28 inhibits T cell adhesion by recruiting CAPRI to the plasma membrane," J Immunol 2015;194:2871-7.
JL Riley, "PD-1 signaling in primary T cells," Immunol Rev 2009;229:114-25. PMCID: 3424066.
N. Patsoukis, et al., "Revisiting the PD-1 pathway," Sci Adv 2020;6:eabd2712. PMCID: 7500922.
M. Peled, et al., "Affinity purification mass spectrometry analysis of PD-1 uncovers SAP as a new checkpoint inhibitor," Proc Natl Acad Sci 2018;115:468-77. PMCID: 5776966.
AS Tocheva, et al., "Checkpoint inhibitors: applications for autoimmunity," Curr Allergy Asthma Rep 2017;17:72. NIHMSID: 1679600.
S. Sandigursky, et al., "Targeting the programmed cell death-1 pathway in rheumatoid arthritis," Autoimm Rev 2017;16:767-773. PMCID: 5596871.
X. Xu, et al., "Phosphorylation-mediated IFN-γR2 membrane translocation is required to activate macrophage innate response," Cell 2018; 175:1336-1351.
CC Fan, et al., "EFHD2 promotes epithelial-to-mesenchymal transition and correlates with postsurgical recurrence of stage I lung adenocarcinoma," Science Rep 2017;7:14617. PMCID: 5668280.
M. Strazza, et al., "Transmembrane adaptor protein PAG is a novel mediator of PD-1 inhibitory signaling in T cells," Comms Bio 2021; 4:672.
A. Tocheva, et al., "In vitro assays to study PD-1 biology in human T cells," Curr Proto Immunol 2020;130;e103. NIHMSID: 1679598.
M. Peled, et al., "Co-immunoprecipitation Assay for Studying Functional Interactions Between Receptors and Enzymes," J Vis Exp 2018;139:58433. PMCID: 6235382.
MA Dragovich, et al., "SLAMF6 clustering is required to augment T cell activation," PLoS One 2019;2006:131-140. PMCID: 6568412.
MA Dragovich, et al., "The SLAM family receptors: potential therapeutic targets for inflammatory and autoimmune diseases," Autoimm Rev 2018; 17:674-82. PMCID: 6508580.
Y. Gartshteyn, et al., "SLAM Associated Protein signaling in T cells: tilting the balance toward autoimmunity," Front Immunol 2021; doi: 10.3389/fimmu.2021.654839.
E. Hui, et al., "T cell costimulatory receptor CD28 is a primary target for PD-1-mediated inhibition," Science 2017;355:1428-1433. PMCID: 6286077.
S. Sandigursky, et al., "SAP interacts with CD28 to inhibit PD-1 signaling in T lymphocytes," Clinical Immunology 2020;108485. NIHMSID 1602943.
Y. Liu, et al., "ITK inhibition induced in vitro and in vivo anti-tumor activity through downregulating TCR signaling pathway in malignant T cell lymphoma," Cancer Cell Int 2019; 19:32. PMCID: 6376795.
M. Strazza, et al., "SHP2 targets ITK downstream of PD-1 to inhibit T cell function," Inflammation 2021; doi. org/10.1007/s10753-021-01437-8. NIHMSID: 1679599.
I. Azoulay-Alfaguter, et al., "The tyrosine phosphatase SHP-1 promotes T cell adhesion by activating the adaptor protein CrkII in the immunological synapse," Sci Signal 2017;10:eaal2880. NIHMSID: 1679596.
M. Strazza, et al., "Static adhesion assay for the study of integrin activation in T lymphocytes," J Vis Exp. Jun. 13, 2014; (88):51646.
Y. Kim, et al., "Suppression of hematopoietic cell kinase ameliorates the bone destruction associated with inflammation," Mod Rheumatol 2020;30:85-92.
IF Fernández, et al., "VRK2 inhibits mitogen-activated protein kinase signaling and inversely correlates with ErbB2 in human breast cancer," Molecular Cell Biol. Oct. 2010;30(19):4687-97. PMCID: 2950518.
J. Lee, et al., "Vaccinia-related kinase 2 plays a critical role in microglia-mediated synapse elimination during neurodevelopment," Glia. 2019;67:1667-1679.
M. Sanz-García, et al., "Proteomics identification of nuclear Ran GTPase as an inhibitor of human VRK1 and VRK2 (vaccinia-related kinase) activities," Molelcular Cell Proteomics 2008;7:2199-214. PMCID: 2577208.
S. Blanco, et al., "Modulation of interleukin-1 transcriptional response by the interaction between VRK2 and the JIP1 scaffold protein," PLoS One 2008;3:e1660. PMCID: 2243017.
S. Blanco, et al., "Vaccinia-related kinase 2 modulates the stress response to hypoxia mediated by TAK1," Molelular Cell Biol 2007;27:7273-83 PMCID: 2168905.
M. Strazza, et al., "Assay of adhesion under shear stress for the study of T lymphocyte adhesion molecular interactions," Journal Visulaized Expertise 2016;112. PMCID: 4993289.
EA Philips, et al., "The structural features that distinguish PD-L2 from PD-L1 emerged in placental mammals," Journal Bio. Chem 2020;295:4372-4380. PMCID: 7135984.
ME Goebeler, et al., "Blinatumomab: a CD19/CD3 bispecific T cell engager (BiTE) with unique anti-tumor efficacy," Leuk Lymphoma. May 2016;57(5):1021-32. PMID: 27050240.

(56) References Cited

OTHER PUBLICATIONS

S. Lerrer, et al., "PD-1-stimulated T cell subsets are transcriptionally and functionally distinct," iScience. Aug. 24, 2021;24(9):103020. PMID: 34522863.
M. Vázquez-Cedeira, et al., "Human VRK2 (vaccinia-related kinase 2) modulates tumor cell invasion by hyperactivation of NFAT1 and expression of cyclooxygenase-2," J Biol Chem. 2012;287:42739-50. PMCID: 3522273.
A. Mor, et al., "The lymphocyte function-associated antigen-1 receptor costimulates plasma membrane Ras via phospholipase D2," Nat Cell Biol 2007;9:713-9.
A. Mor, et al., "Characterization of Erk activation in human mast cells stimulated by contact with T cells," Inflammation 2010; 33: 119-25.
M. Peled, et al., "Co-immunoprecipitation assay for studying functional interactions between receptors and enzymes," Journal Visualized Exp. 2018; 139: 58433.
M. Strazza, et al., "PD-1 induced proliferating T cells exhibit a distinct transcriptional signature," Immunology Nov. 2021;164(3):555-568. PMID: 34164813.
U. Lorenz, "SHP-1 and SHP-2 in T cells: two phosphatases functioning at many levels," Immunol Rev. Mar. 2009;228(1):342-59. PMID: 19290938.
H. Zhu, et al., "Vaccinia-related kinase 2 drives pancreatic cancer progression by protecting Plk1 from Chfr-mediated degradation," Oncogene. Jul. 2021;40(28):4663-4674. PMID: 34140642.
DS Shin, et al., "Primary Resistance to PD-1 Blockade Mediated by JAK1/2 Mutations," Cancer Discov. Feb. 2017;7(2):188-201. PMID: 27903500.
DY Torrejon, et al., "Overcoming Genetically Based Resistance Mechanisms to PD-1 Blockade," Cancer Discov. Aug. 2020;10(8):1140-1157. PMID: 32467343.
A. Kalbasi, et al., "Uncoupling interferon signaling and antigen presentation to overcome im munotherapy resistance due to JAK1 loss in melanoma," Sci Transl Med. Oct. 14, 2020;12(565):eabb0152. PMID: 33055240.
CM Fares, et al., "Mechanisms of Resistance to Immune Checkpoint Blockade: Why Does Checkpoint Inhibitor Immunotherapy Not Work for All Patients?" Am Soc Clin Oncol Educ Book. Jan. 2019;39:147-164. PMID: 31099674.
E. Aizman, et al., "Therapeutic effect of farnesylthiosalicylic acid on adjuvant-induced arthritisthrough suppressed release of inflammatory cytokines," Clin Exp Immunol. Mar. 2014;175(3):458-67PMID: 24215151.
G. Wang, et al., "The effects of PDL-Ig on collagen-induced arthritis" Rheumatol Int. Apr. 2011;31(4):513-9.PMID: 20035333.
AS Tocheva, et al., "Checkpoint Inhibitors: Applications for Autoimmunity," Curr Allergy Asthma Rep. Sep. 27, 2017;17(10):72. PMID: 28956259.
PH Wooley, "Immunotherapy in collagen-induced arthritis: past, present, and future," Am J Med Sci. Apr. 2004;327(4):217-26. PMID: 15084918.
AR Moore, "Collagen-induced arthritis," Methods Mol Biol. 2003;225:175-179. PMID: 12769486 (abstract).
Martinez-Limon, et al., "The p38 Pathway: From Biology to Cancer Therapy", PMID: 32168915, Int. J. Mol. Sci., 21(6):1913, Mar. 11, 2020 (18 pages).
Mu, et al., "Blocking VRK2 suppresses pulmonary adenocarcinoma progression via ERK1/2/AKT signal pathway by targeting miR-145-5p", PMID: 34156669, Eur Rev Med Pharmacol Sci, 25(11):3993, Jul. 2021—Retracted (1 page).
Blanco, et al., "The Subcellular Localization of Vaccinia-Related Kinase-2 (VRK2) Isoforms Determines Their Different Effect on p53 Stability in Tumour Cell Lines", FEBS, 273(11):2487- 2504, Jun. 2006 (18 pages).
Carroll, et al., "Extending Remission and Reversing New-Onset Type 1 Diabetes by Targeted Ablation of Autoreactive T Cells", Diabetes, 67(11):2319-2328, Nov. 2018 (10 pages).
Clinical Trial NCT00413686, "Study to Assess Safety of AZD7762 Administered Alone and in Combination With Gemcitabine in Patients With Advanced Solid Malignancies", Sponsor: AstraZeneca, Dec. 20, 2006 (7 pages).
Clinical Trial NCT00937664, "Safety and Tolerability Study of AZD7762 in Combination With Gemcitabine", Sponsor: AstraZeneca, Jul. 13, 2009 (8 pages).
Clinical Trial NCT03790488, "Study of a PD-1 Inhibitor (JTX-4014) in Subjects With Solid Tumor Malignancies", Sponsor: Jounce Therapeutics, Inc., Dec. 31, 2018 (12 pages).
Clinical Trial NCT04549025, "Study of PD-1 Inhibitor JTX-4014 Alone and in Combination With Vopratelimab in Biomarker-selected Subjects With Metastatic NSCLC After One Prior Platinum-containing regimen (SELECT)", Sponsor: Jounce Therapeutics, Inc., Sep. 16, 2020 (18 pages).
Darvin, et al., "Immune Checkpoint Inhibitors: Recent Progress and Potential Biomarkers", Exp. Mol. Med., 50(12): 165, Dec. 13, 2018 (11 pages).
Kim, et al., "Vaccinia-Related Kinase 2 Mediates Accumulation of Polyglutamine Aggregates via Negative Regulation of the Chaperonin TRIC", Molecular and Cellular Biology, 34(4): 643-652, Feb. 2014 (10 pages).
Liu, et al., "Gemcitabine and Chk1 Inhibitor AZD7762 Synergistically Suppress the Growth of Lkb1-Deficient Lung Adenocarcinoma", Cancer Research, 77(18):5068-5076, Sep. 15, 2017 (9 pages).
Marin-Acevedo, et al., "Next Generation of Immune Checkpoint Inhibitors and Beyond", J. Hematol Oncol, 14:45, Mar. 19, 2021 (29 pages).
NIH Grant 1R03TR003343-01, "Novel genetic dependencies in VRK2 methylated glioblastoma multiforme", https://reporter.nih.gov/search/oYVCtbe1cESmpe4boTYKVA/project-details/10046375#publications, Awardee Organization: Dana-Farber Cancer Inst, Start Date Sep. 1, 2020 (34 pages).
Papadopoulos, et al., "Abstract P439: Phase 1 first in human study of programmed cell death receptor-1(PD-1) inhibitor monoclonal antibody (mAb) JTX-4014 in adult subjects with advanced refractory solid rumor [sic] malignancies", Journal for Immuno Therapy of Cancer, 7(Suppl 1): 282, pp. 239-240, 2019 (2 pages).
Park, et al., "Repositioning of anti-cancer drug candidate, AZD7762, to an anti-allergic drug suppressing IgE-mediated mast cells and allergic responses via the inhibition of Lyn and Fyn", Biochemical Pharmacology, 154:270-277, May 17, 2018 (8 pages).
Peled, et al., "EF Hand domain family member D2 is required for T cell cytotoxicity", Author Manuscript published in final edited form as J Immunol, 201(9):2824-2831, Nov. 1, 2018 (21 pages).
Ryu, et al., "HNRNP Q suppresses polyglutamine huntingtin aggregation by post-transcriptional regulation of vaccinia-related kinase 2", Journal of Neurochemistry, 149(3):413-426, 2019 (14 pages).
Sausville, et al., "Phase I dose-escalation study of AZD7762, a checkpoint kinase inhibitor, in combination with gemcitabine in US patients with advanced solid tumors", Author Manuscript published in final edited form as Cancer Chemotherapy and Pharmacology, 73(3):539-549, Mar. 2014 (19 pages).
Seto, et al., "Phase I, dose-escalation study of AZD7762 alone and in combination with gemcitabine in Japanese patients with advanced solid tumours", Cancer Chemotherapy and Pharmacology, 72(3):619-627, published online Jul. 28, 2013 (9 pages).
Clinical Trial NCT00473616, "Phase | Single Ascending Dose/ Multiple Ascending Dose in Patients Treated With AZD7762 and Irinotecan", Sponsor: AstraZeneca, May 15, 2007 (8 pages).
Wang, et al., "Effects of a checkpoint kinase inhibitor, AZD7762, on tumor suppression and bone remodeling", International Journal of Oncology, 53(3): 1001-1012, Sep. 2018 (12 pages).

\* cited by examiner

FIGURE 2A
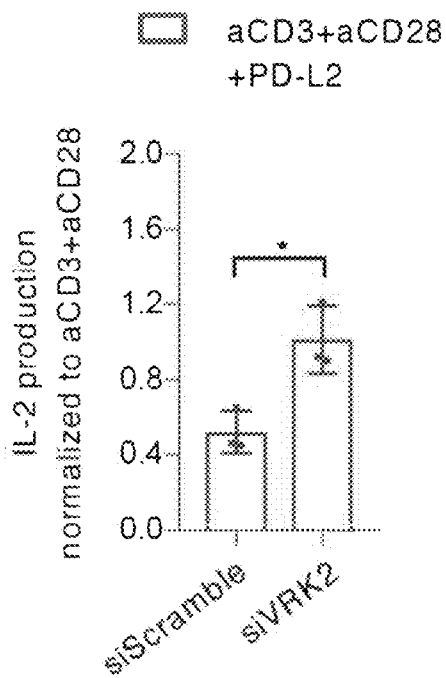
FIGURE 2B
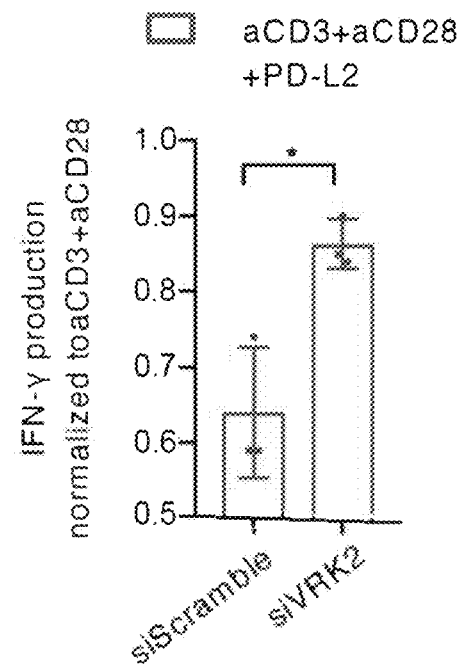
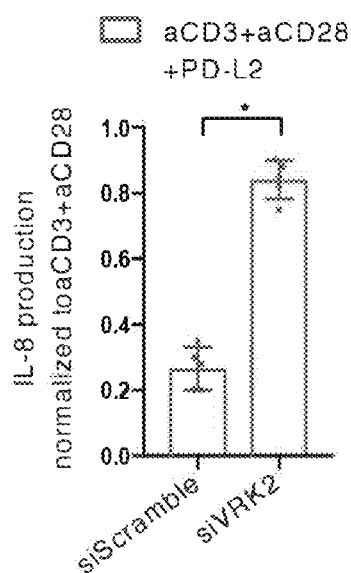
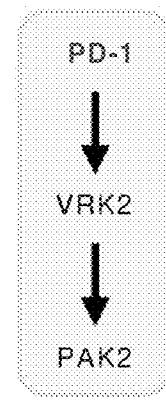
FIGURE 2C
FIGURE 2D

FIGURE 2E
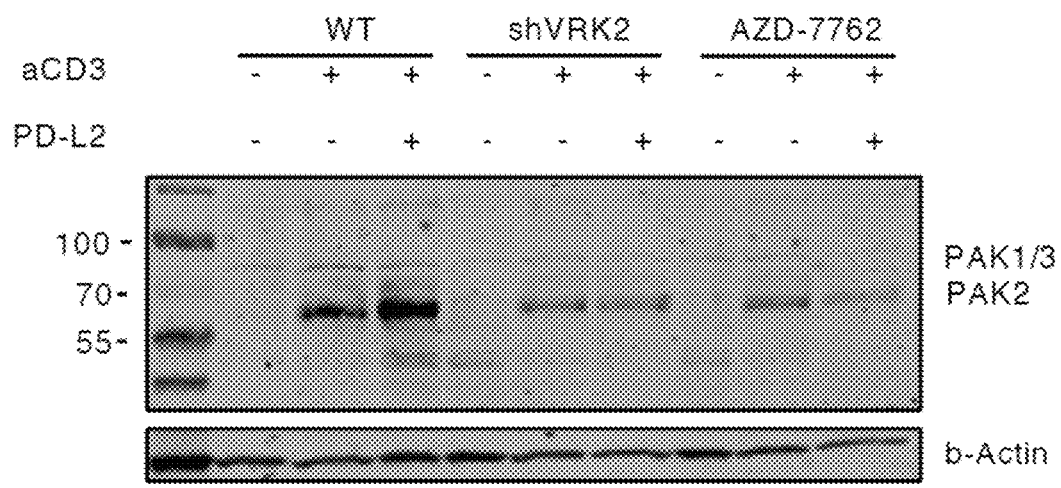
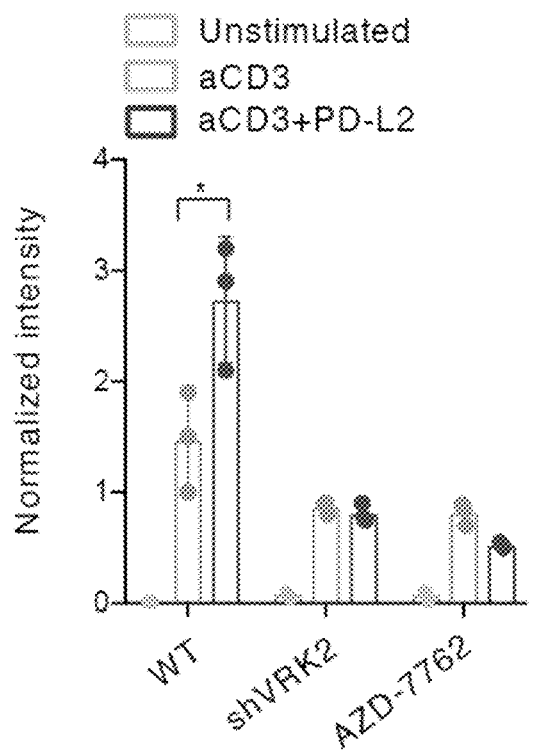
FIGURE 2F

FIGURE 3E
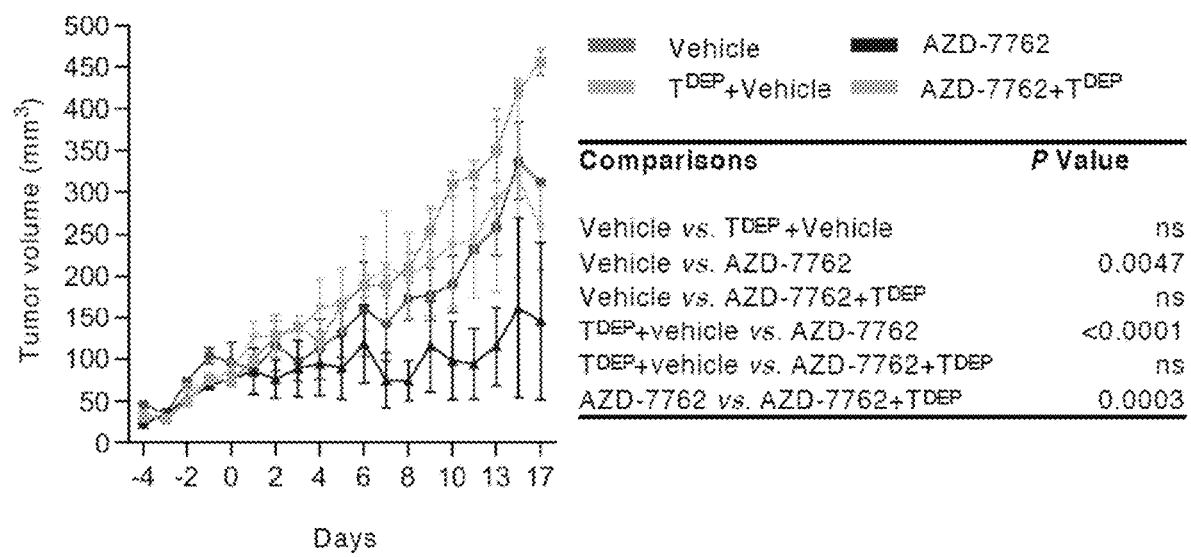
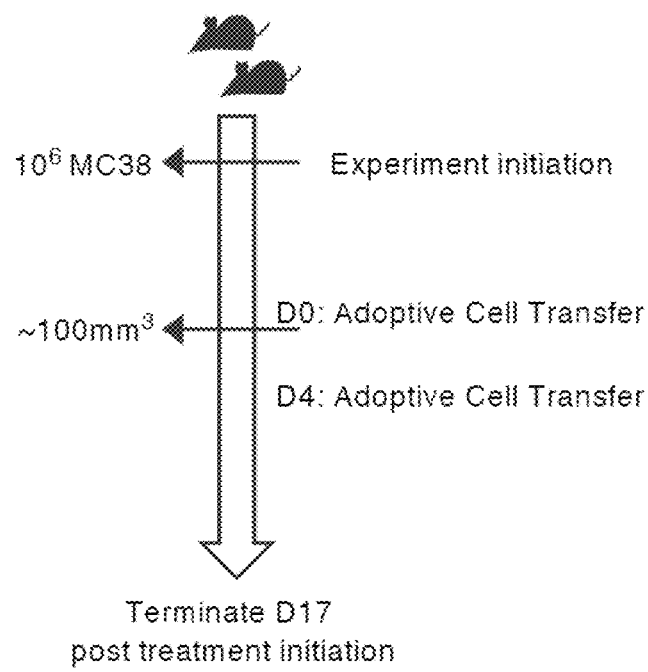
FIGURE 3F

FIGURE 5A
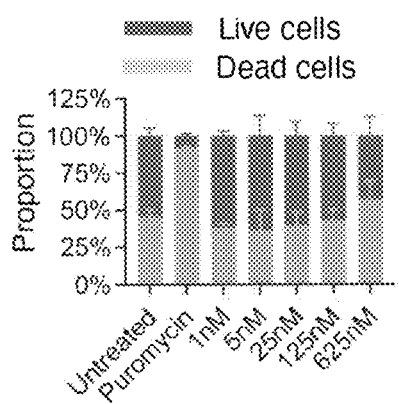
FIGURE 5B
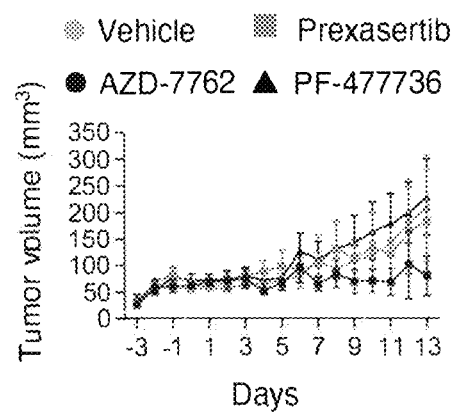
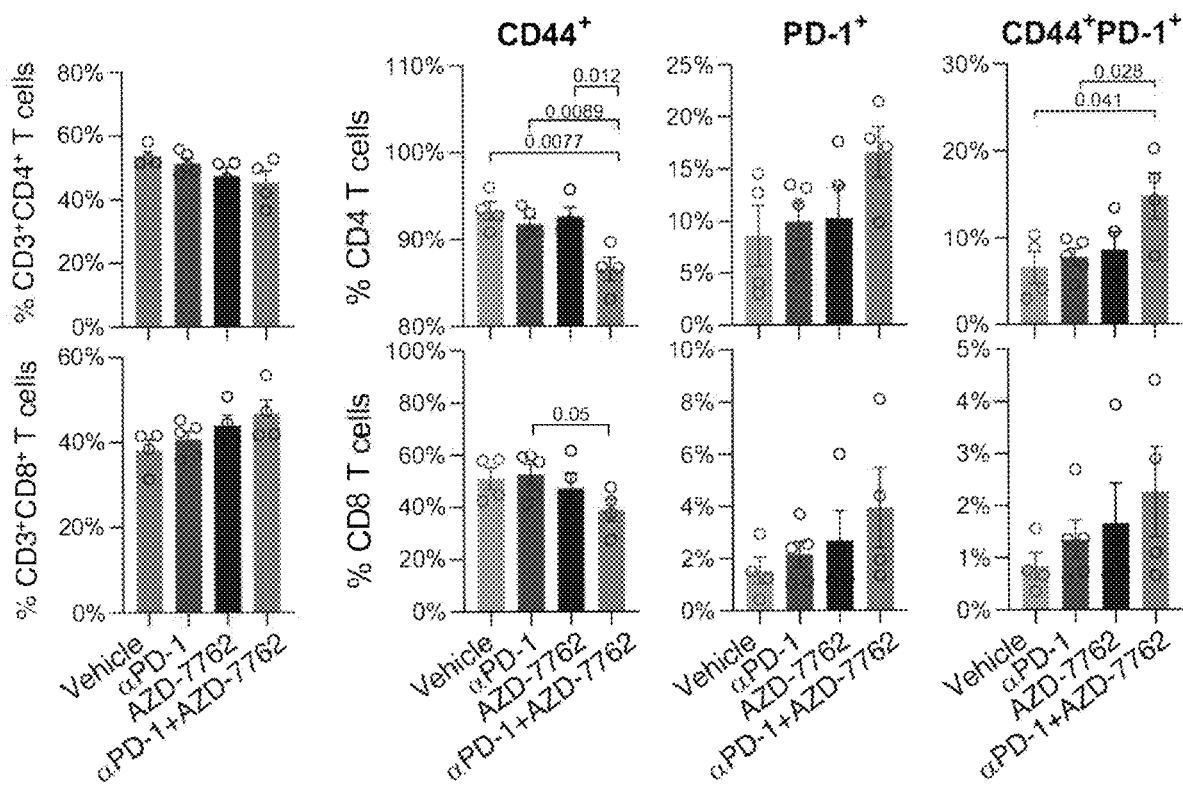
FIGURE 5C

FIGURE 6A
FIGURE 6C
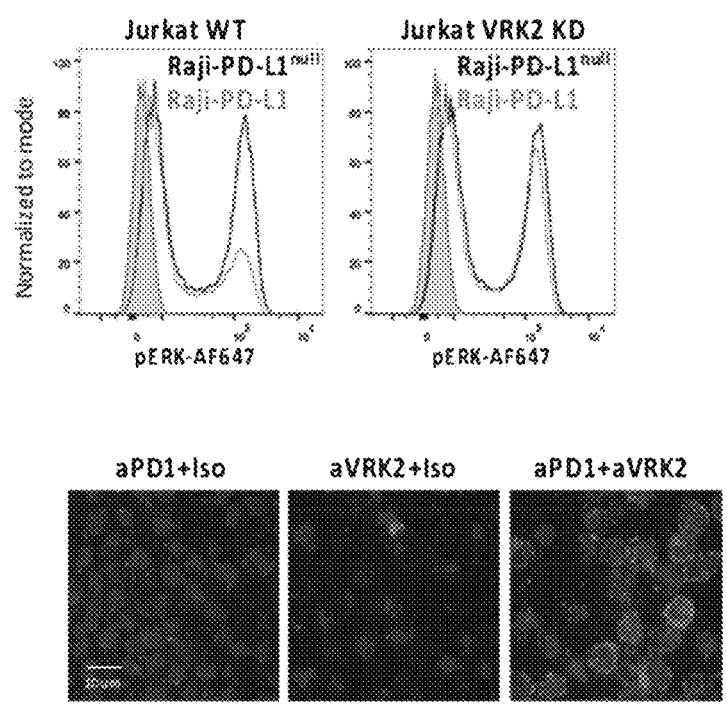
FIGURE 6B
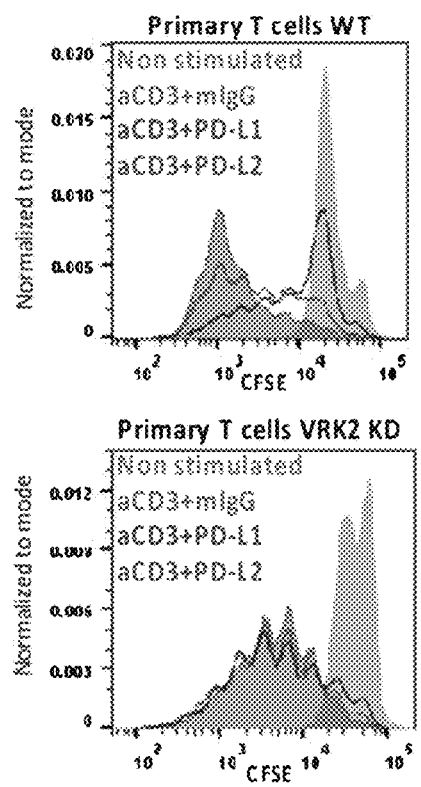

FIGURE 7A
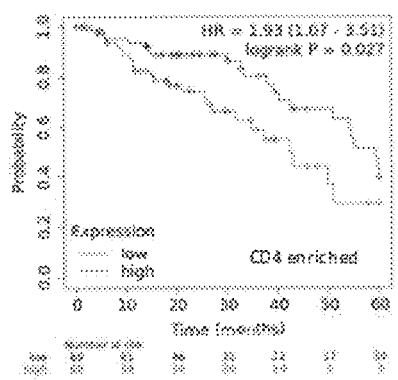
FIGURE 7B
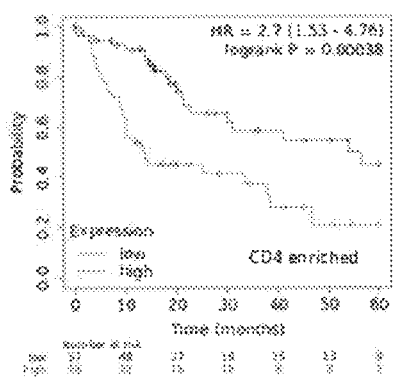
FIGURE 7C
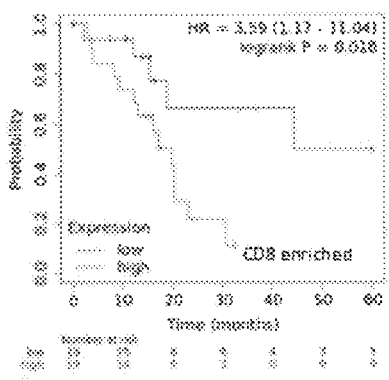
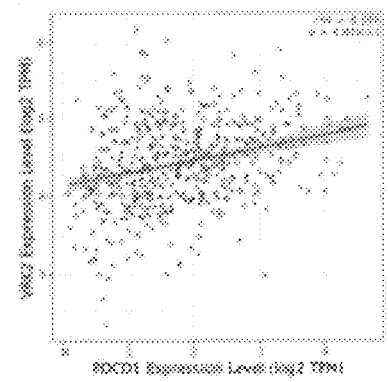
FIGURE 7D
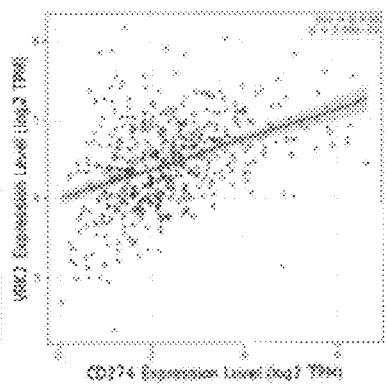
FIGURE 7E
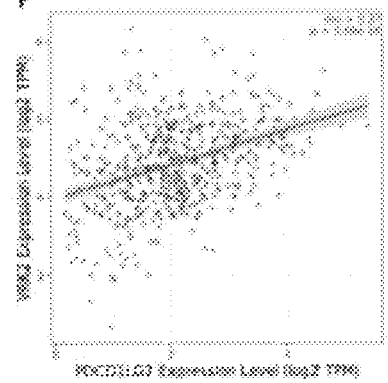
FIGURE 7F

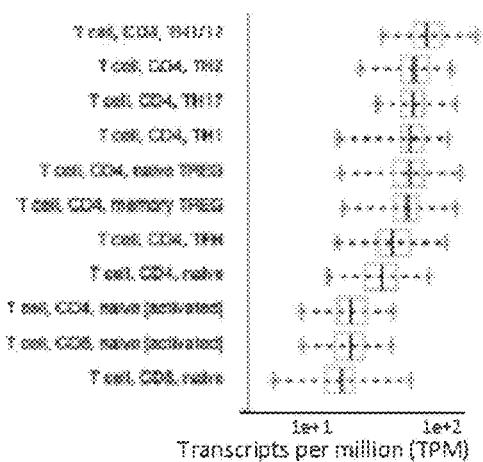
FIGURE 8
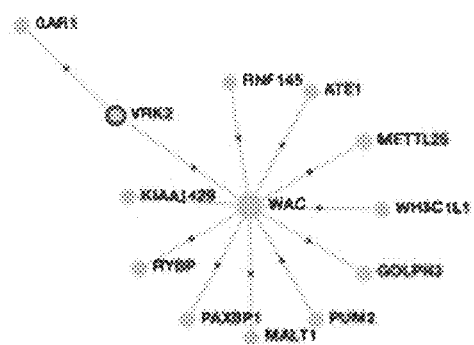 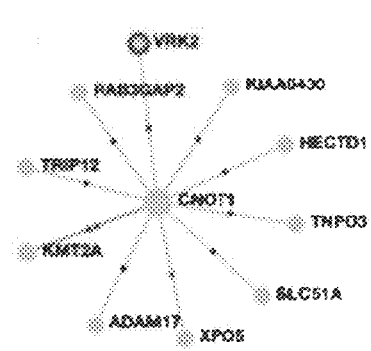 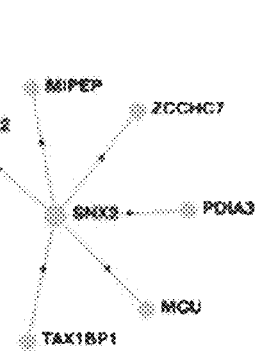
FIGURE 9A     FIGURE 9B     FIGURE 9C

SEQUENCE LISTING

```
<160> NUMBER OF SEQ ID NOS: 23

<210> SEQ ID NO 1
<211> LENGTH: 59
<212> TYPE: RNA
<213> ORGANISM: Homo sapiens

<400> SEQUENCE: 1
ccggcuggag gauuuggauu gauaucucga gauaucaauc caaauccucc aguuuuug        59

<210> SEQ ID NO 2
<211> LENGTH: 57
<212> TYPE: RNA
<213> ORGANISM: Homo sapiens

<400> SEQUENCE: 2
ccgggggaag aaguuacaga uuuaucucga gauaaaucug uaacuucuuc ccuuuuu         57

<210> SEQ ID NO 3
<211> LENGTH: 59
<212> TYPE: RNA
<213> ORGANISM: Homo sapiens

<400> SEQUENCE: 3
ccgggcauca ugcauggcua caugucucga gacauguagc caugcaugau gcuuuuug       59

<210> SEQ ID NO 4
<211> LENGTH: 59
<212> TYPE: RNA
<213> ORGANISM: Homo sapiens

<400> SEQUENCE: 4
ccggccauag cccaucaagc uccugcucga gcaggagcuu gaugggcuau gguuuuug       59

<210> SEQ ID NO 5
<211> LENGTH: 59
<212> TYPE: RNA
<213> ORGANISM: Homo sapiens
```

<400> SEQUENCE: 5
ccggcccaca gcacacacgu caaaucucga gauuugacgu gugugcugug gguuuuuug    59

<210> SEQ ID NO 6
<211> LENGTH: 57
<212> TYPE: RNA
<213> ORGANISM: Homo sapiens

<400> SEQUENCE: 6
ccgggcugua aagugaguu uguaacucga guuacaaacu cacuucuaca gcuuuuu    57

<210> SEQ ID NO 7
<211> LENGTH: 57
<212> TYPE: RNA
<213> ORGANISM: Homo sapiens

<400> SEQUENCE: 7
ccggagcaca gcaaauccuc agacacucga gugucugagg auuugcugug cuuuuuu    57

<210> SEQ ID NO 8
<211> LENGTH: 58
<212> TYPE: RNA
<213> ORGANISM: Homo sapiens

<400> SEQUENCE: 8
ccggauuacc ugcaggugga auauucucga gaauauucca ccugcaggua auuuuug    58

<210> SEQ ID NO 9
<211> LENGTH: 58
<212> TYPE: RNA
<213> ORGANISM: Homo sapiens

<400> SEQUENCE: 9
ccggucaccc agcugccuga cuauacucga guauagucag gcagcugggu gauuuug    58

<210> SEQ ID NO 10
<211> LENGTH: 21
<212> TYPE: RNA
<213> ORGANISM: Homo sapiens

<400> SEQUENCE: 10
guccauacuc caaacaguca a    21

<210> SEQ ID NO 11
<211> LENGTH: 21
<212> TYPE: RNA
<213> ORGANISM: Homo sapiens

<400> SEQUENCE: 11
gcaauuaggu auccgaaugu u    21

<210> SEQ ID NO 12
<211> LENGTH: 21
<212> TYPE: RNA
<213> ORGANISM: Homo sapiens

<400> SEQUENCE: 12
gaagagacaa acgcagaugu u    21

<210> SEQ ID NO 13
<211> LENGTH: 21
<212> TYPE: RNA

<213> ORGANISM: Homo sapiens

<400> SEQUENCE: 13
ggagaaacug auuggauuga u                                          21

<210> SEQ ID NO 14
<211> LENGTH: 21
<212> TYPE: RNA
<213> ORGANISM: Homo sapiens

<400> SEQUENCE: 14
gcuggaugua cuggaauaua u                                          21

<210> SEQ ID NO 15
<211> LENGTH: 21
<212> TYPE: RNA
<213> ORGANISM: Homo sapiens

<400> SEQUENCE: 15
ggacuuuccu acagauauug u                                          21

<210> SEQ ID NO 16
<211> LENGTH: 21
<212> TYPE: RNA
<213> ORGANISM: Homo sapiens

<400> SEQUENCE: 16
gaucccagaa agggccauaa u                                          21

<210> SEQ ID NO 17
<211> LENGTH: 21
<212> TYPE: RNA
<213> ORGANISM: Homo sapiens

<400> SEQUENCE: 17
guauuacuau gggaucacua u                                          21

<210> SEQ ID NO 18
<211> LENGTH: 21
<212> TYPE: RNA
<213> ORGANISM: Homo sapiens

<400> SEQUENCE: 18
guuggaugua cuggaauaua u                                          21

<210> SEQ ID NO 19
<211> LENGTH: 21
<212> TYPE: RNA
<213> ORGANISM: Homo sapiens

<400> SEQUENCE: 19
cuggaggauu uggauugaua u                                          21

<210> SEQ ID NO 20
<211> LENGTH: 21
<212> TYPE: RNA
<213> ORGANISM: Homo sapiens

<400> SEQUENCE: 20
gggaagaagu uacagauuua u                                          21

<210> SEQ ID NO 21
<211> LENGTH: 21

```
<212> TYPE: RNA
<213> ORGANISM: Homo sapiens

<400> SEQUENCE: 21
gcucuucacc gaaauguugu a                                              21

<210> SEQ ID NO 22
<211> LENGTH: 21
<212> TYPE: RNA
<213> ORGANISM: Homo sapiens

<400> SEQUENCE: 22
gccaaacuau caagcccuca a                                              21

<210> SEQ ID NO 23
<211> LENGTH: 21
<212> TYPE: RNA
<213> ORGANISM: Homo sapiens

<400> SEQUENCE: 23
gcucauaguu uagcauauga u                                              21
```

METHODS, COMPOSITIONS, KITS AND USES THEREOF TARGETING AND/OR TREATING VRK2 TO ENHANCE EFFECTIVENESS OF IMMUNE CHECKPOINT INHIBITOR(S)

CROSS-REFERENCE TO RELATED APPLICATION(S)

This application relates to and claims priority from U.S. Patent Application No. 63/177,594, filed on Apr. 21, 2021, the entire disclosure of which is incorporated herein by reference.

STATEMENT REGARDING FEDERALLYN FUNDED RESEARCH

This invention was made with government support under Grant Nos. AI25640 and AI150597, awarded by the National Institutes of Health. The government has certain rights in the invention.

FIELD OF THE DISCLOSURE

The present disclosure relates to methods, compositions, kits and uses thereof for treating neoplasia by inhibiting Vaccinia Related Kinase 2 (VRK2), e.g., alone or in combination with Programmed cell Death receptor-1 (PD-1) blockade. For example, the present disclosure provides an exemplary method for treating neoplasia in a subject comprising administering to the subject a therapeutically effective amount of a VRK2 inhibitor, alone or in combination with blockade of PD-1. The exemplary methods, compositions and kits described herein can improve cancer immunotherapy.

BACKGROUND INFORMATION

Despite its clinical utility, the molecular pathways engaged by the checkpoint PD-1 remain poorly defined. PD-1 lacks intrinsic enzymatic activity, and instead recruits other proteins to mediate its inhibitory function. In T cells, T cell receptor (TCR) recognition of antigens presented by major histocompatibility complex (MHC) molecules and PD-1 colocalization with the TCR are absolute requirements for PD-1 function. Following antigen recognition, PD-1 binds to its ligands, programmed death ligand 1 (PD-L1) (see, e.g., Reference 19) and programmed death ligand 2 (PD-L2), expressed on tumor cells and antigen presenting cells (APC) (see, e.g., References 10-4). Ligand binding leads to tyrosine phosphorylation of the immune tyrosine inhibitory motif (ITIM) and immune tyrosine switch motif (ITSM) within the cytoplasmic tail of PD-1, which subsequently recruits the tyrosine phosphatase Src homology 2 (SH2) domain containing tyrosine phosphatase 2 (SHP2) (see, e.g., Reference 5). Subsequently, SHP2 dephosphorylates proteins critical for proximal TCR signaling, such as CD3, ZAP70, CD28, ITK and C3G (see, e.g., References 6-10). A study reported that the subcellular localization of VRK2 isoforms determines their different effect on p53 stability in tumor cell lines (see, e.g., Reference 23).

Knowledge regarding the phosphorylation networks triggered by PD-1 and that interfere with proximal and distal TCR signaling was limited. This significant knowledge gap undermines the understanding of PD-1 function in T cells and hampers the development of improved therapeutics targeting the PD-1 axis.

Accordingly, there may be a need to address and/or at least partially overcome at least some of the prior deficiencies described herein.

SUMMARY OF EXEMPLARY EMBODIMENTS

To at least partially address and/or overcome such issues and/or deficiencies, exemplary methods, compositions, kits and uses thereof for treating neoplasia by inhibiting VRK2 can be provided, alone or in combination with PD-1 blockade, can be provided according to certain exemplary embodiments of the present disclosure. Such exemplary methods can comprise, e.g., administering to the subject a therapeutically effective amount of a VRK2 inhibitor.

According to certain exemplary embodiments of the present disclosure, a method for treating neoplasia in a subject can be provided, comprising, e.g., administering to the subject a VRK2 inhibitor and an inhibitor of PD-1, such as an antagonist of PD-1 and an anti-PD-1 antibody. In certain exemplary embodiments of the present disclosure, the VRK2 inhibitor and the inhibitor of PD-1 can act synergistically or additively to treat neoplasia. According to certain exemplary embodiments of the present disclosure, the VRK2 inhibitor and the inhibitor of PD-1 can act synergistically to enhance an anti-tumor T cell response.

According to certain exemplary embodiments of the present disclosure, a method can be provided for enhancing T cell activation by an inhibitor of PD-1, in a subject receiving the inhibitor of PD-1, comprising administering to the subject a VRK2 inhibitor.

According to certain exemplary embodiments of the present disclosure, a method can be provided for enhancing a therapeutic effect of an inhibitor of PD-1 for treating neoplasia in a subject, comprising administering to the subject a VRK2 inhibitor before, during, and/or after administering the inhibitor of PD-1 to the subject.

According to certain exemplary embodiments of the present disclosure, a method can be provided, e.g., for preventing or treating resistance to an PD-1 blockade cancer therapy in a subject, comprising administering to the subject a VRK2 inhibitor before, during, and/or after administering an inhibitor of PD-1 to the subject.

According to certain exemplary embodiments of the present disclosure, a composition can be provided for treating neoplasia, comprising, e.g., an inhibitor of PD-1 and a VRK2 inhibitor. An exemplary composition for treating neoplasia may comprise a combination including at least one dose of a medicament comprising an inhibitor of PD-1 and at least one dose of a medicament comprising a VRK2 inhibitor.

According to certain exemplary embodiments of the present disclosure, a kit can be provided, comprising, e.g., at least one dose of a medicament comprising an inhibitor of a PD-1; at least one dose of a medicament comprising a VRK2 inhibitor; and a package insert comprising instructions for treating a subject for neoplasia using the medicaments.

The exemplary subjects according to certain exemplary embodiments of the present disclosure may include a human or an animal.

Examples of the neoplasia include a solid tumor, a non-solid (hemopoietic) tumor and/or a cancer. Examples of the neoplasia include melanoma, squamous cell carcinoma, non-Hodgkin and Hodgkin lymphoma, chronic and acute leukemia, nasopharyngeal carcinoma, head and neck cancer, uterine sarcoma, urethral and bladder cancer, liver and intrahepatic bile cancer, prostate cancer, renal cell and renal pelvis carcinoma, endometrial cancer, pancreas tumor, thyroid cancer, breast cancer, glioblastoma, osteosarcoma, colon and rectal adenocarcinoma, small cell lung cancer and non-small cell lung cancer, and combinations thereof.

Exemplary VRK2 inhibitor that can be used in the methods, compositions and kits according to certain exemplary embodiments of the present disclosure include a nonspecific VRK2 inhibitor, a specific VRK2 inhibitor and combinations thereof. An exemplary nonspecific VRK2 inhibitor can be AZD-7762. In certain exemplary embodiments of the present disclosure, a specific VRK2 inhibitor is used without the use of a nonspecific VRK2 inhibitor. According to certain exemplary embodiments of the present disclosure, the VRK2 inhibitor comprises at least one of AZD-7762, IC-261, siRNA to VRK2, and shRNA to VRK2, and a pharmaceutically acceptable salt thereof. According to certain exemplary embodiments of the present disclosure, the VRK2 inhibitor comprises AZD-7762 or a pharmaceutically acceptable salt thereof. According to certain exemplary embodiments of the present disclosure, the VRK2 inhibitor comprises siRNA to VRK2.

Exemplary inhibitors of PD-1 that may be used in the methods, compositions and kits according to certain exemplary embodiments of the present disclosure include an antagonist of PD-1, an anti-PD-1 antibody, an anti-PD-L1 antibody (including nivolumab, pembrolizumab, atezolizumab, avelumab, durvalumab, cemiplimab, dostarlimab, saprtalizumab, camrelizumab, sintilimab, toslelizumab, toripalimab), AMP-224, AMP-514, JTX-4014, MGA012, KN035, CK-301, AUNP12, CA-170, BMS-986189, and combinations thereof.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 2A is an exemplary graph of VRK2 is used for PD-1 inhibitory functions with IL-2;

FIG. 2B is an exemplary graph of VRK2 is used for PD-1 inhibitory functions with IFN-γ;

FIG. 2C is an exemplary graph of VRK2 is used for PD-1 inhibitory functions with IL-8; an inhibition in response to plate-bound stimulation in the presence of PD-L2 following siRNA knockdown of VRK2 in primary human T cells. Data from n=3 independent experiments.

FIG. 2D is a schematic diagram of PD-1, VRK2 and PAK2 interaction sequence.

FIG. 2E is an illustration of an exemplary western blot analysis of PAK2 S197 phosphorylation in Jurkat T cells left untreated, following shRNA knockdown of VRK2 (shVRK2) and in Jukrat T cells treated with AZD-7762 inhibitor. Statistical analysis was performed using unpaired Student's t test, where *p≤0.05;

FIG. 2F is a graph of an exemplary quantification of PAK2 S197 phosphorylation in Jurkat T cells left untreated;

FIG. 3E is a graph of an exemplary MC38 tumor growth curves in CD4 and CD8 T cells depleted mice measured in 3 mice from two independent experiments.

FIG. 3F is a combination of a graph and an illustration of exemplary adoptive cell transfers' experimental scheme;

FIG. 5A is a graph of viability and T cell phenotypic analysis following treatment with AZD-7762, PF-477736 and Prexasertib, whereas an exemplary MC38 viability is illustrated following treatment with AZD-7762;

FIG. 5B is a graph of the viability and T cell phenotypic analysis, which illustrates an exemplary MC38 tumor growth curves of mice treated with the indicated drugs, with drugs being orally administered, daily, and the data represent mean±SEM of tumor volume measured in five mice from each group;

FIG. 5C is a graph of the viability and T cell phenotypic analysis, which illustrates an exemplary surface phenotype of splenic T cells at day 17 post-tumor implantation. n=4 mice from two independent experiments;

FIG. 6A is a set of graphs providing an exemplary conjugate assay between Jurkat T cells and Raji B cells expressing PD-L1 demonstrating that in the absence of VRK2, PD-1 cannot inhibit phosphorylation of ERK, with exemplary representative flow experiment being shown;

FIG. 6B is a set of exemplary graphs providing an exemplary proximity ligation assay (PLA) of primary human T cells showing physical proximity between PD-1 and VRK2. Red dots represent PD-1-VRK2 complexes, with an exemplary representative experiment being shown;

FIG. 6C is a set of exemplary graphs providing an exemplary CFSE dilution assay of primary human T cells, siRNA depleted of VRK2 demonstrating lack of PD-1 inhibition of T cell proliferation in the absence of VRK2, with an exemplary representative flow experiment being shown;

FIGS. 7A-7F a set of graphs providing exemplary data demonstrating that higher levels of VRK2 are associated with worse prognosis. Kaplan-Mayer curves showing that the 5 years survival rates of patients with liver cancer (FIG. 7A), lung cancer (FIG. 7B) and pancreas cancer (FIG. 7C) is in inverse correlation with VRK2 transcript levels in T cell enriched tumor biopsies (TCGA database); and FIGS. 7D to 7F illustrating an exemplary correlation between the expression of VRK2 and PD-1 (FIG. 7D), PD-L1 (FIG. 7E), and PD-L2 (FIG. 7F) in T cells of lung cancer patients (TIMER online recourse). To highlight how the two—variable fit, linear regression was applied;

FIG. 8 is an exemplary graph showing differential expression of VRK2 in different T cell subsets. VRK2 levels are shown using single cell RNAseq data of peripheral T cells collected from lung cancer patients (iCellR);

FIGS. 9A-9C are exemplary illustrations of differential interaction of VRK2 in different T cell subsets. String analysis of VRK2 based on gene expression signatures of individual T cell subset: (A) CD4 $T_{H17}$, (B) CD4 $T_{H1}$, (C) CD8 $T_N$ (STRING);

Figure 1A:
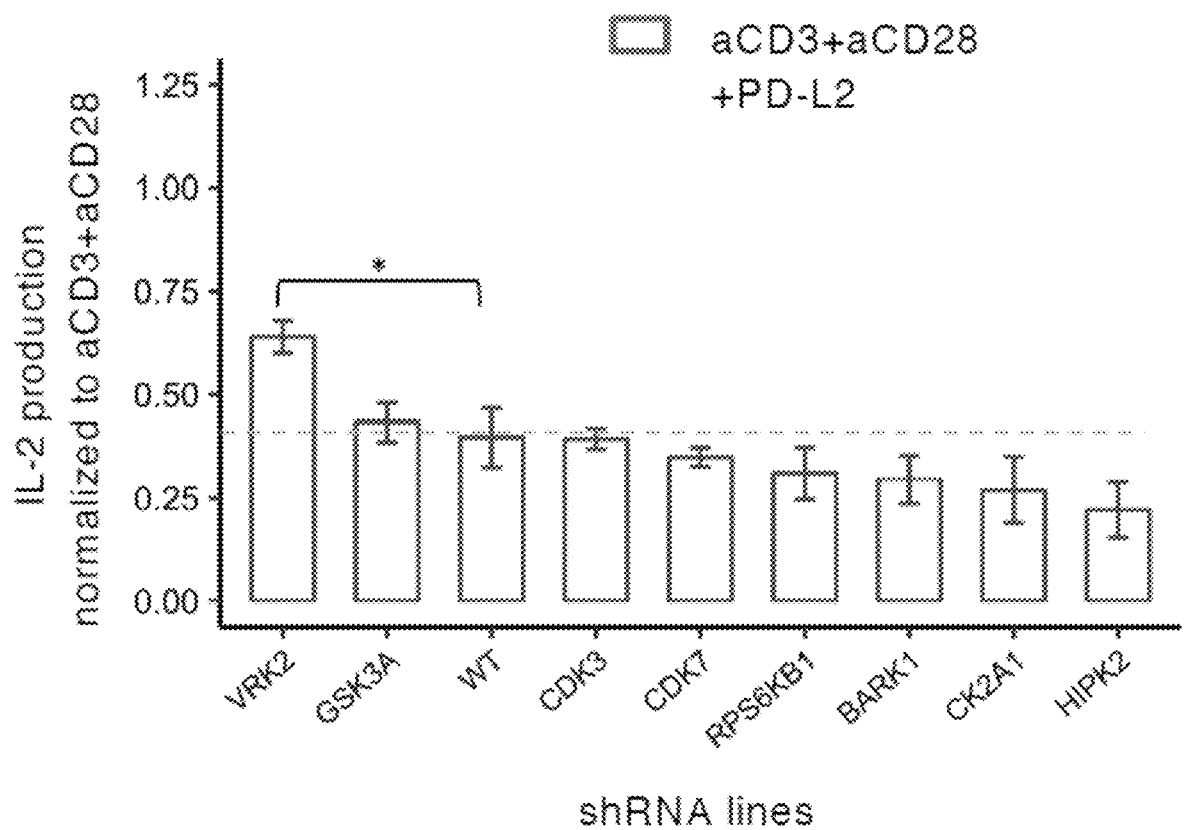
FIG. 1A is a graph of exemplary predicted kinases downstream of PD-1, with IL-2 inhibition following stimulation of the different kinase knock-down Jurkat T cells lines with aCD3+aCD28+PD-L2-Fc relative to aCD3+aCD28. Bar graphs show mean±SEM of n: 3 independent experiments performed in triplicate.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Therapeutic PD-1 blockade enhances T cell mediated anti-tumor immunity but many patients do not respond and a significant proportion develops inflammatory and immune toxicity side effects (see, e.g., Reference 20). To develop better therapeutics and to understand the signaling pathways downstream of PD-1, the present inventor performed phosphoproteomic analysis of PD-1 and identified VRK2 as a key mediator of PD-1 signaling. Using genetic and pharmacological approaches, the present inventor discovered that VRK2 is required for PD-1-induced phosphorylation of the protein PAK2, and for the inhibition of IL-2, IL-8, and IFN-γ secretion. Moving into in vivo syngeneic tumor models, pharmacologic inhibition of VRK2 in combination with PD-1 blockade enhanced tumor clearance through T cell activation. These exemplary results suggest that VRK2 is a unique therapeutic target. According to an exemplary embodiment of the present disclosure, a method for treating neoplasia can be provided which can comprise administering to a subject a combination of VRK2 inhibitors with PD-1 blockade. The compositions, kits and methods according to the present disclosure may improve cancer immunotherapy.

To address the prior deficiencies, the PD-1-regulated phosphoproteome was investigated using mass spectrometry (see, e.g., Reference 11). Through this approach it was identified that the extent of PD-1-regulated phosphorylation networks extends far beyond proximal TCR signaling. In fact, the functional consequences of PD-1 signaling lies at the intersection of phosphorylation networks associated with TCR signaling, cytoskeletal organization, cell cycle, gene expression, and protein translation (see, e.g., Reference 11).

According to an exemplary embodiment of the present disclosure, it has been determined that VRK2 is an effector of PD-1 signaling. The ability of PD-1 to inhibit cytokine secretion was reduced in the absence of VRK2 and interfering with VRK2 function in vivo augmented the anti-tumoral effect of PD-1 blockade. These data suggest that cancer patients might benefit from combining VRK2 inhibitors with anti-PD1 blocking antibody.

Therapeutic PD-1 blockade enhances T cell mediated anti-tumor immunity but many patients do not respond and a significant proportion develops inflammatory toxicities. To develop better therapeutics and to understand the signaling pathways downstream of PD-1, the present inventor performed phosphoproteomic analysis of PD-1 and identified VRK2 as a key mediator of PD-1 signaling. Using both in vitro and in vivo assays, the role of this kinase in mediating PD-1 inhibitory functions in T cells is validated.

It has been determined, according to exemplary embodiments of the present disclosure, that VRK2 is an appropriate downstream effector of PD-1 signaling. Pharmacologic inhibition of VRK2 in combination with PD-1 blockade enhanced tumor clearance through T cell activation. VRK2 is a unique therapeutic target and combination of VRK2 inhibitors with PD-1 blockade may improve cancer immunotherapy.

The PD-1 pathway is an important immune checkpoint for T cells. Antibodies that block PD-1 function promote T cell-mediated identification and clearance of tumor cells, and are powerful therapeutics against a wide variety of cancers. Unfortunately, only a fraction of the patients who receive anti-PD-1 therapeutics have durable clinical responses, and up to 30% of responders develop immune-related adverse events. New agents to target proteins downstream of PD-1 and augment the activity of PD-1-directed therapeutics are urgently needed.

Using exemplary embodiments of the present disclosure, Phosphoproteomic Mass Spectrometry combined with in-silico Prediction Algorithm (PMSP) is provided, which identified the kinase VRK2 as a critical PD-1 downstream effector. Using this exemplary method according to the exemplary embodiments of the present disclosure, the VRK2, a serine-threonine kinase, was predicted to phosphorylate 26% of all differentially phosphorylated protein downstream of PD-1. To validate if this kinase mediated signaling downstream of PD-1, VRK2 knock-down and CRISPR/Cas9 VRK2 knock-out cell lines have been generated. IL-2 production in response to T cell receptor stimulation in the presence of PD-1 ligation was measured to determine the consequences of VRK2 knock-down on PD-1 signaling. Significantly, VRK2 knock-down cells were the least susceptible to PD-1 mediated inhibition of IL-2 production. It was also determined that VRK2 knockdown abrogated primary T cell responses to PD-1 ligation. Multiple additional functional assays, using both Jurkat and primary human T cells, also strongly indicated that VRK2 was a critical downstream effector of PD-1.

Using the MC38 syngeneic mouse adenocarcinoma tumor model, it was determined whether VRK2 inhibition alone or in combination with PD-1 blockade would improve anti-tumor immune response according to exemplary embodiments of the present disclosure. AZD-7762, a selective inhibitor of VRK2, as well as the checkpoint kinases (CHK1 and CHK2), was used. This agent did not cause additional cytotoxicity when cultured in vitro with an MC38 cells, and caused less cytotoxicity compared to two other CHK specific inhibitors in mouse splenocytes following overnight treatment. AZD-7762 treatment alone led to significantly decreased tumor volume compared to vehicle or anti-PD-1 treatment.

To exclude the possibility that AZD-7762 acts primarily by inhibiting tumor growth via CHK1 and CHK2 in the tumor cells, according to exemplary embodiments of the present disclosure, tumor growth kinetics have been determined in response to treatment with the two others specific CHK inhibitors, LY2606368 and PF-47736. Compared to these drugs, AZD-7762 treatment led to marked decrease in tumor volume indicating that its activity was probably not mediated solely via CHK inhibition. Furthermore, AZD-7762 acted synergistically with PD-1 blockade and augmented anti-tumor responses compared to PD-1 blockade alone or AZD-7762 treatment alone.

In a set of adoptive T cell transfer experiments, according to certain exemplary embodiments of the present disclosure, it was demonstrated that VRK2 expression in the T cell compartment was required for PD-1 function and signaling and had a critical role in the immune response to malignancies and that PD-1 blockade acts synergistically with VRK2 inhibition to augment an antitumor response.

According to certain exemplary embodiments of the present disclosure, a method for treating neoplasia and or for activating a T cell response is provided targeting VRK2 downstream of PD-1 can be provided. According to certain exemplary embodiments of the present disclosure, a method for treating neoplasia in a subject comprises administering to the subject an VRK2 inhibitor and an inhibitor of PD-1 can further be provided. In an exemplary embodiment of the present disclosure, the VRK2 inhibitor and the inhibitor of PD-1 can act synergistically to treat the neoplasia. In an exemplary embodiment of the present disclosure, the VRK2 inhibitor and the inhibitor of PD-1 may be administered simultaneously. In an exemplary embodiment of the present disclosure, the VRK2 inhibitor can be administered before the inhibitor of PD-1. In an exemplary embodiment of the present disclosure, the VRK2 inhibitor may be administered after the inhibitor of PD-1.

Exemplary VRK2 inhibitor that can be used in the methods, compositions and kits according to certain exemplary embodiments of the present disclosure can include a nonspecific VRK2 inhibitor, a specific VRK2 inhibitor and combinations thereof. An exemplary nonspecific VRK2 inhibitor can be AZD-7762. In certain exemplary embodiments of the present disclosure, a specific VRK2 inhibitor is used without the use of a nonspecific VRK2 inhibitor. According to certain exemplary embodiments of the present disclosure, the VRK2 inhibitor comprises at least one of AZD-7762, IC-261, siRNA to VRK2, and shRNA to VRK2, and a pharmaceutically acceptable salt thereof.

According to certain exemplary embodiments of the present disclosure, the VRK2 inhibitor comprises AZD-7762 or a pharmaceutically acceptable salt thereof. According to certain exemplary embodiments of the present disclosure, the VRK2 inhibitor comprises IC-261 or a pharmaceutically acceptable salt thereof. According to certain exemplary embodiments of the present disclosure, the VRK2 inhibitor can comprise siRNA to VRK2, which can have a nucleotide sequence that is the same as a nucleotide sequence of an siRNA to VRK2 disclosed in this disclosure or have a nucleotide sequence having at least 70%, 75%, 80%, 85%, 90%, 95%, 97% or 99% homology with said disclosed nucleotide sequence. According to certain exemplary embodiments of the present disclosure, the VRK2 inhibitor can comprise shRNA to VRK2, which may have a nucleotide sequence that is the same as a nucleotide sequence of an shRNA to VRK2 described in the present disclosure and/or can have a nucleotide sequence having at least 70%, 75%, 80%, 85%, 90%, 95%, 97% or 99% homology with said disclosed nucleotide sequence.

The VRK2 inhibitor and/or the inhibitor of PD-1 may be administered intravenously, intramuscularly, subcutaneously, topically, orally, transdermally, intraperitoneally, intraorbitally, by implantation, by inhalation, intrathecally, intraventricularly, or intranasally.

According to certain exemplary embodiments of the present disclosure, a composition for treating neoplasia may comprise an inhibitor of PD-1 and a VRK2 inhibitor.

The exemplary embodiments of the present disclosure can encompass the use of the peptides such as polypeptides, nucleic acids, antibodies, small molecules and other therapeutic agents formulated in pharmaceutical compositions to administer to a subject. The therapeutic agents (also referred to as "active compounds") can be incorporated into pharmaceutical compositions suitable for administration to a subject, e.g., a human. Such exemplary compositions typically comprise the polypeptides, nucleic acids, antibodies, small molecules and a pharmaceutically acceptable carrier.

As used herein the language "pharmaceutically acceptable carrier" is intended to include any and all solvents, binders, diluents, disintegrants, lubricants, dispersion media, coatings, antibacterial and antifungal agents, isotonic and absorption delaying agents, and the like, compatible with pharmaceutical administration. The use of such media and agents for pharmaceutically active substances is well known in the art. As long as any conventional media or agent is compatible with the active compound, such media can be used in the compositions of the invention. Supplementary active compounds or therapeutic agents can also be incorporated into the compositions. A pharmaceutical composition of the invention is formulated to be compatible with its intended route of administration. Examples of routes of administration include parenteral, e.g., intravenous, intradermal, intranasal, subcutaneous, oral, inhalation, transdermal (topical), transmucosal, and rectal administration.

The term "administer" is used in its broadest sense and includes any method of introducing the compounds or compositions of the present invention into a subject. This includes producing polypeptides or polynucleotides in vivo as by transcription or translation of polynucleotides that have been exogenously introduced into a subject. Thus, polypeptides or nucleic acids produced in the subject from the exogenous compositions are encompassed in the term "administer."

In an exemplary embodiment of the present disclosure, the active compounds are prepared with carriers that will protect the compound against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Methods for preparation of such formulations will be apparent to those skilled in the art.

It is especially advantageous to formulate oral or parenteral compositions in unit dosage form for ease of administration and uniformity of dosage. "Unit dosage form" as used herein refers to physically discrete units suited as unitary dosages for the subject to be treated; each unit containing a predetermined quantity of active compound calculated to produce the desired therapeutic effect in association with the required pharmaceutical carrier. The specification for the unit dosage forms of the invention are dictated by and directly dependent on the unique characteristics of the active compound and the particular therapeutic effect to be achieved, and the limitations inherent in the art of compounding such an active compound for the treatment of individuals.

Oral compositions generally include an inert diluent or an edible carrier. They can be enclosed in gelatin capsules or compressed into tablets. Depending on the specific conditions being treated, pharmaceutical compositions according to certain exemplary embodiments of the present disclosure may be formulated and administered systemically or locally. Techniques for formulation and administration can be found in "Remington: The Science and Practice of Pharmacy" (20th edition, Gennaro (ed.) and Gennaro, Lippincott, Williams & Wilkins, 2000). For oral administration, the agent may be contained in enteric forms to survive the stomach or further coated or mixed to be released in a particular region of the GI tract by known methods. For the purpose of oral therapeutic administration, the active compound may be incorporated with excipients and used in the form of tablets, troches, or capsules. Oral compositions can also be prepared using a fluid carrier for use as a mouthwash, whereas the compound in the fluid carrier is applied orally and swished and expectorated or swallowed. Pharmaceutically compatible binding agents, and/or adjuvant materials can be included as part of the composition. The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, or corn starch; a lubricant such as magnesium stearate; a glidant such as colloidal silicon dioxide; a sweetening agent such as sucrose or saccharin; or a flavoring agent such as peppermint, methyl salicylate, or orange flavoring.

A "therapeutically effective amount" of a protein or polypeptide, small molecule, antibody, or nucleic acid used in the methods, products, and compositions of the present disclosure is an amount that achieves the desired therapeutic result. For example, if a therapeutic agent is administered to treat cancer, a therapeutically effective amount is an amount that alleviates one or more symptoms related to the cancer.

It is understood that the appropriate dose of an active agent, such as a VRK2 inhibitor or an inhibitor of PD-1, can depend upon a number of factors within the skill of the ordinarily skilled physician, veterinarian, or researcher. The dose(s) of the active agent will vary, for example, depending upon the identity, size, and condition of the subject or sample being treated, further depending upon the route by which the composition is to be administered, and the effect which the practitioner desires the active agent to have. It is furthermore understood that appropriate doses of an active agent depend upon the potency of the active agent with respect to the expression or activity to be modulated. In addition, it is understood that the specific dose level for any particular subject will depend upon a variety of factors including the activity of the specific compound employed, the age, body weight, general health, and diet of the subject, the time of administration, the route of administration, the rate of excretion, whether other drugs are being administered to the patient, and the degree of expression or activity to be modulated.

The exemplary embodiments of the present disclosure is illustrated herein by the following examples, which should not be construed as limiting. The contents of all references, pending patent applications and published patents, cited throughout this application are hereby expressly incorporated by reference. Those skilled in the art will understand that these exemplary embodiments of the present disclosure may be embodied in many different forms and should not be construed as limited to the embodiments set forth herein. Rather, these exemplary embodiments are provided so that the present disclosure will fully convey the exemplary embodiment of the present disclosure to those skilled in the art. Various exemplary modifications and other exemplary embodiments of the present disclosure will come to mind in one skilled in the art to which this invention pertains having the benefit of the teachings presented in the foregoing description. Although specific terms are employed, they are used as in the art unless otherwise indicated.

EXAMPLES

Exemplary Materials and Methods
General Reagents
RPMI 1640 medium, DMEM, Dulbecco's PBS, and FBS were purchased from Life Technologies. Opti-MEMI was purchased from Invitrogen. Ficoll-Paque was purchased from Stem Cell. BCA assay was purchased from Pierce Biotechnology. Puromycin was obtained from Sigma-Aldrich.

Exemplary Cell Culture, Transfection, and Stimulation
Peripheral blood was purchased from New York blood center. Total CD3 T cells were isolated by density gradient centrifugation (Lymphoprep) and negative selection using the RosetteSep human T cell enrichment cocktail (Stem Cell). Primary T cells were directly used in stimulation assays.

In vitro T cell cultures were maintained in complete RPMI, containing 10% FBS, MEM nonessential amino acids, 1 mM sodium pyruvate, 100 IU/ml of penicillin, 100 µg/ml streptomycin and GlutaMAX-1. Jurkat T cells were obtained from the American Type Culture Collection and maintained in RPMI 1640 medium supplemented with 10% FBS and 100 U/ml penicillin and streptomycin. MC38 cells were provided by Kerafast and maintained in DMEM medium supplemented with 10% FBS and 100 U/ml penicillin and streptomycin. HEK 293T cells were obtained from the American Type Culture Collection and maintained in 5%

$CO_2$ at 37° C. in DMEM media supplemented with 10% FBS and 100 U/ml penicillin and streptomycin. Cells were stimulated with magnetic beads (ratio of 1:5 cells per bead), which were conjugated with the following protein combinations (the ratio in parentheses indicates the relative concentration of each protein): anti-CD3/IgG1 (1:3), anti-CD3/PDL1-Fc/IgG1 (1:2:1), anti-CD3/PDL2-Fc/IgG1 (1:2:1), anti-CD3/anti-CD28/IgG1 (1:1:2), or anti-CD3/anti-CD28/PD-L2-Fc (1:1:2).

Exemplary Antibodies

Anti-CD3 (UCHT1), and PD-L2-Fc were purchased from Acros. IgG1 (isotype control) was purchased from Jackson ImmunoResearch. Anti-CD28 (CD28.2) was purchased from eBioscience. Anti-mouse antibodies were purchased from BioLegend: CD3-AF488 (clone 17A2), CD8-PercpCy5.5 (clone 53-6.7), CD4-PE (clone GK1.5), CD44-BV421 (clone IM7), PD-1-PECy7 (clone RPM1-30), CD62L-BV711 (clone MEL-14), CD69-BV711 (clone H1.2F3), and LAG-3-PE (clone C9B7W).

Exemplary Cytokine Secretion

IL-2, IL-8, and IFN-γ concentrations in the supernatant were measured by enzyme linked immunosorbent assay (ELISA) from BioLegend.

Exemplary Western Blot

To determine PAK phosphorylation, $5 \times 10^6$ Jurkat T cells were washed with cold PBS and resuspended in complete RPMI. The cells were stimulated for 5 minutes with Dynabeads at 37° C. as indicated above (beads/cells ratio of 3:1). The samples were treated with Calyculin A (CST 99025) at 100 nM for 25 minutes at 37° C., washed once with cold PBS and centrifugation at 500×g and lysed with RIPA buffer supplemented with PhosStop (Roche) for 1 hr at 4° C. Following 10 second sonication and centrifugation at 12,000×g for 10 minutes at 4° C., the samples were blotted using Phospho-PAK1 (Ser199/204)/PAK2 (Ser192/197) antibody (Cell Signaling). Blots were imaged and analyzed using Licor Odyssey.

Exemplary Knocking Down PD-1 Related Kinases

Kinases were stably knocked down in Jurkat T cells by short hairpin RNA using Mission shRNA plasmids (Sigma-Aldrich). Lentiviral particles were generated by transfecting BEK 293T cells with pMD2G, psPAX2, and the shRNA plasmid using SuperFect (Qiagen). T cells were transduced by centrifugation and selected with puromycin. SMARTpool ON-TARGETplus VRK2 and nontargeting control small interfering siRNA (Dharmacon) were used according to the manufacturer's instruction. The oligonucleotides were SMARTpool-ON-Target plus, ID #004684-00-0005 (GUCCAUACUCCAAACAGUCAA (SEQ ID NO:10), GCAAUUAGGUAUCCGAAUGUU (SEQ ID NO:11), GAAGAGACAAACGCAGAUGUU (SEQ ID NO:12), GGAGAAACUGAUUGGAUUGAU (SEQ ID NO:13)) and ID #040621-00-0005 (GCUGGAUGUACUGGAAUAUAU (SEQ ID NO:14), GGACUUUCCUACAGAUAUUGU (SEQ ID NO:15), GAUCCCAGAAAGGGCCAUAAU (SEQ ID NO:16), GUAUUACUAUGGGAUCACUAU (SEQ ID NO:17)).

Exemplary shRNA sequences used to genetically inhibit VRK2 in human T cells can be found below, and in Michael Peled, et al, VRK2 inhibition synergizes with PD-1 blockade to improve T cell responses, Immunology Letters 233 (2021) 42-47 and Michael Peled, et al, Data on the identification of VRK2 as a mediator of PD-1 function, Data in Brief 37 (2021) 107168, and any supplemental data/disclosure thereof, the contents of which are hereby incorporated by reference in its entirety.

VRK2 (#1):
(SEQ ID NO: 1)
CCGGCUGGAGGAUUUGGAUUGAUAUCUCGAGAUAUCAAUCCAAAUCCUC
CAGUUUUUUG.

VRK2 (#2):
(SEQ ID NO: 2)
CCGGGGGAAGAAGUUACAGAUUUAUCUCGAGAUAAAUCUGUAACUUCUU
CCCUUUUU.

BARK1:
(SEQ ID NO: 3)
CCGGGCAUCAUGCAUGGCUACAUGUCUCGAGACAUGUAGCCAUGCAUGA
UGCUUUUUUG.

GSK3A:
(SEQ ID NO: 4)
CCGGCCAUAGCCCAUCAAGCUCCUGCUCGAGCAGGAGCUUGAUGGGCUA
UGGUUUUUUG.

HIPK2:
(SEQ ID NO: 5)
CCGGCCCACAGCACACACGUCAAAUCUCGAGAUUUGACGUGUGUGCUGU
GGGUUUUUUG.

CDK7:
(SEQ ID NO: 6)
CCGGGCUGUAGAAGUGAGUUUGUAACUCGAGUUACAAACUCACUUCUAC
AGCUUUUU.

RPS6KB:
(SEQ ID NO: 7)
CCGGAGCACAGCAAAUCCUCAGACACUCGAGUGUCUGAGGAUUUGCUGU
GCUUUUUU.

CK2A1:
(SEQ ID NO: 8)
CCGGAUUACCUGCAGGUGGAAUAUUCUCGAGAAUAUUCCACCUGCAGGU
AAUUUUUUG.

CDK3:
(SEQ ID NO: 9)
CCGGUCACCCAGCUGCCUGACUAUACUCGAGUAUAGUCAGGCAGCUGGG
UGAUUUUUG.

Exemplary RT-PCR Analysis

Total RNA was extracted using the RNeasy Plus Mini Kit (Qiagen). RNA (500 ng) was used for cDNA synthesis using SuperScript II First Strand Synthesis (Invitrogen). Human kinases and HPRT Taqman Primer/Probes were used for all Taqman Gene Expression Assays with the Tagman Universal PCR Master Mix (Applied Biosystems). Quantitative gene expression analyses were performed with Applied Biosystems 7300 Real-Time PCR. Gene expression was analyzed by the ΔΔCt method.

Mice, MC38 Tumor Inoculation and Exemplary T Cell Analysis

One million MC38 or 4T1 cells were used for inoculation, implanted subcutaneously in the right hind flank of mice. Tumor growth was monitored using electronic calipers and calculated according to the formula: V=length×width$^2$×0.52. For T cell phenotypic analysis by flow cytometry, spleens and inguinal lymph nodes were harvested 17 days post-treatment initiation. Splenic and tdLN cells were stained with anti-mouse antibodies for flow cytometry analysis. To deplete T cells, mice received intraperitoneal injection of 200 µg anti-CD4 (BioXcell BE0003) and 200 µg anti-CD8 (BioXcell BE0061) antibodies in PBS, a second dose of the antibodies was administered two days later. To asses cytotoxicity, MC38 cells were thawed, seeded at a density of $3 \times 10^4$ in a flat bottom 96-well plate and treated overnight at 37° C. and 5% $CO_2$ with AZD-7762 (MCE HY-10992) at the indicated concentrations. Cell viability was measured with PrestoBlue (Invitrogen). AZD-7762 and PF-4,777,736 were given I.P. at 25 mg/kg and 10 mg/kg respectively. Prexasertib was given S.C. at 10 mg/kg. All drugs were given for 12 days.

Exemplary Statistical Analysis

GraphPad Prism software was used for statistical analysis. Unpaired Student's t test was used to compare differences between the means of two groups and a two-tailed p-value ≤0.05 was considered statistically significant, where * p<0.05. To compare the effects of different treatments on tumor volume, repeated measures two-way ANOVA and Tukey's multiple comparisons test with individual variances computed for each comparison were used.

| Exemplary Specification Table | |
|---|---|
| How data were acquired | RNA expression was determined by RT-PCR in QuantStudio 3 RT-PCR system. Concentrations of IL-2 were determined by specific ELISA kits in TEKAN microplate readers. Cell viability was measured with PrestoBlue (Invitrogen) in TEKAN microplate readers. T cells subsets were evaluated by flow cytometry in a MACSQuantR Analyzer 10. Statistical analysis was performed using GrapPad Prism 7 software. |
| Data format | Analysed |
| Parameters for data collection | Jurkat T cell lines were treated with anti-CD3 + anti-CD28 or anti-CD3 + anti-CD28 + recombinant PD-L2 coated beads. MC38 tumor cells were treated with Puromycin or AZD-7762. In vivo: mice harbouring MC38 tumors were orally administered with vehicle control, AZD-7762, Prexasertib and PF-477,736 (mice in each condition). In a second experiment, mice were orally administered with vehicle control or AZD-7762 and injected IP with vehicle control or 200 µg anti-PD-1 at day 0 and day 7 (4 mice in each group), two independent experiments. |
| Description of data collection | Total RNA was extracted using the RNeasy Plus Mini Kit (Qiagen). Media was collected following centrifugation at 500 g for 5 min to remove floating cells from the media, followed by IL-2 ELISA (Biolegend). Tumor growth was monitored by external measurement using callipers. The volume of tumor masses was calculated with the following equation: $0.5 \times \text{Length} \times \text{Width}^2$. Spleens were harvested 17 days post-treatment initiation, followed by tissue dissociated on a mesh. Splenic cells were stained with anti-mouse antibodies for flow cytometry analysis. |

Figure 1B:
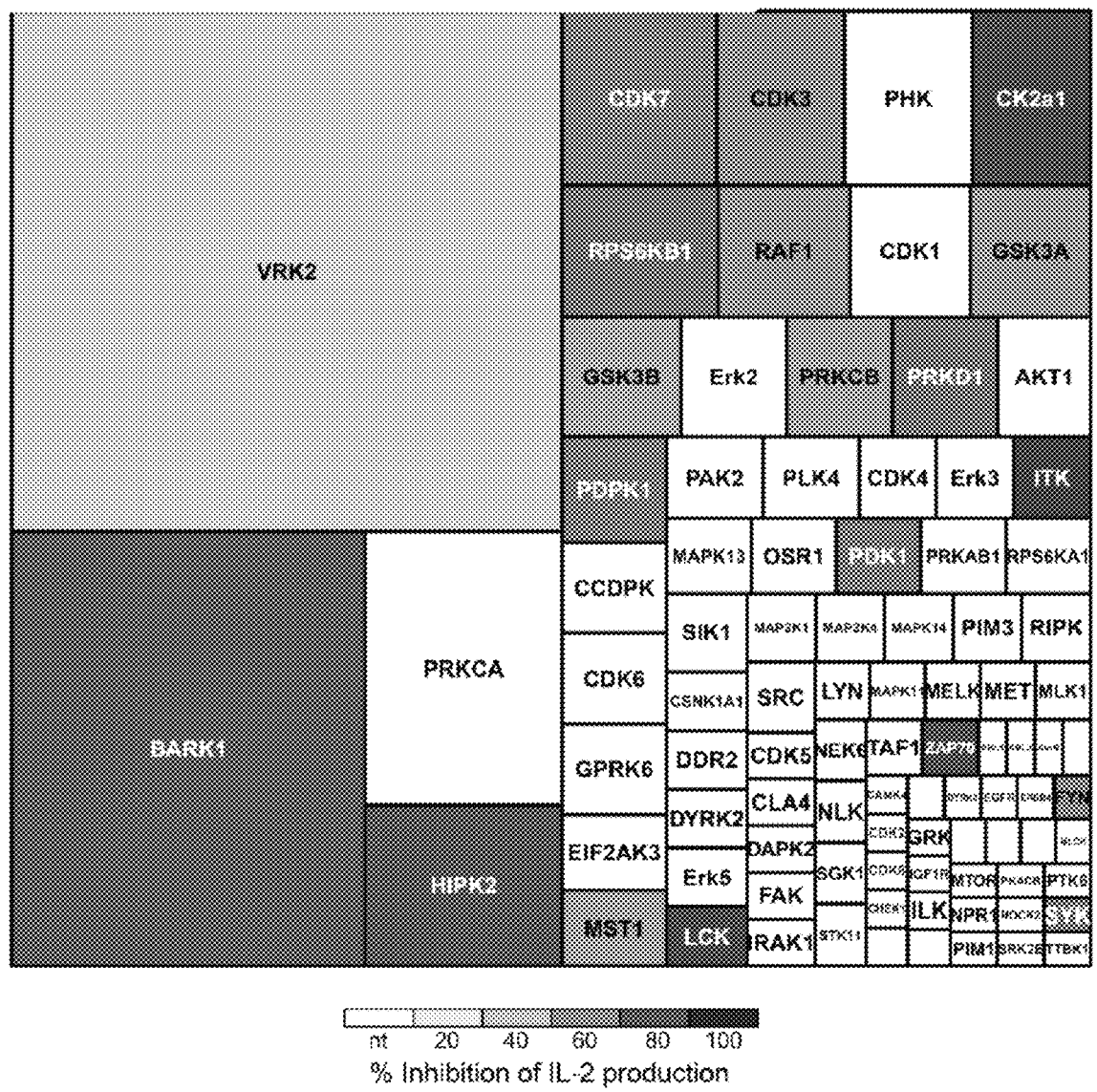
FIG. 1B is an exemplary treemap chart representing the proportion of targeted phosphosites by each kinase (rectangle size) and percent IL-2 inhibition following plate-bound stimulation of the different kinase knock-down Jurkat T cells lines (color intensity). Kinases within the white rectangles were not included in the shRNA knock-down screen; nt not tested.
Figure 4A:
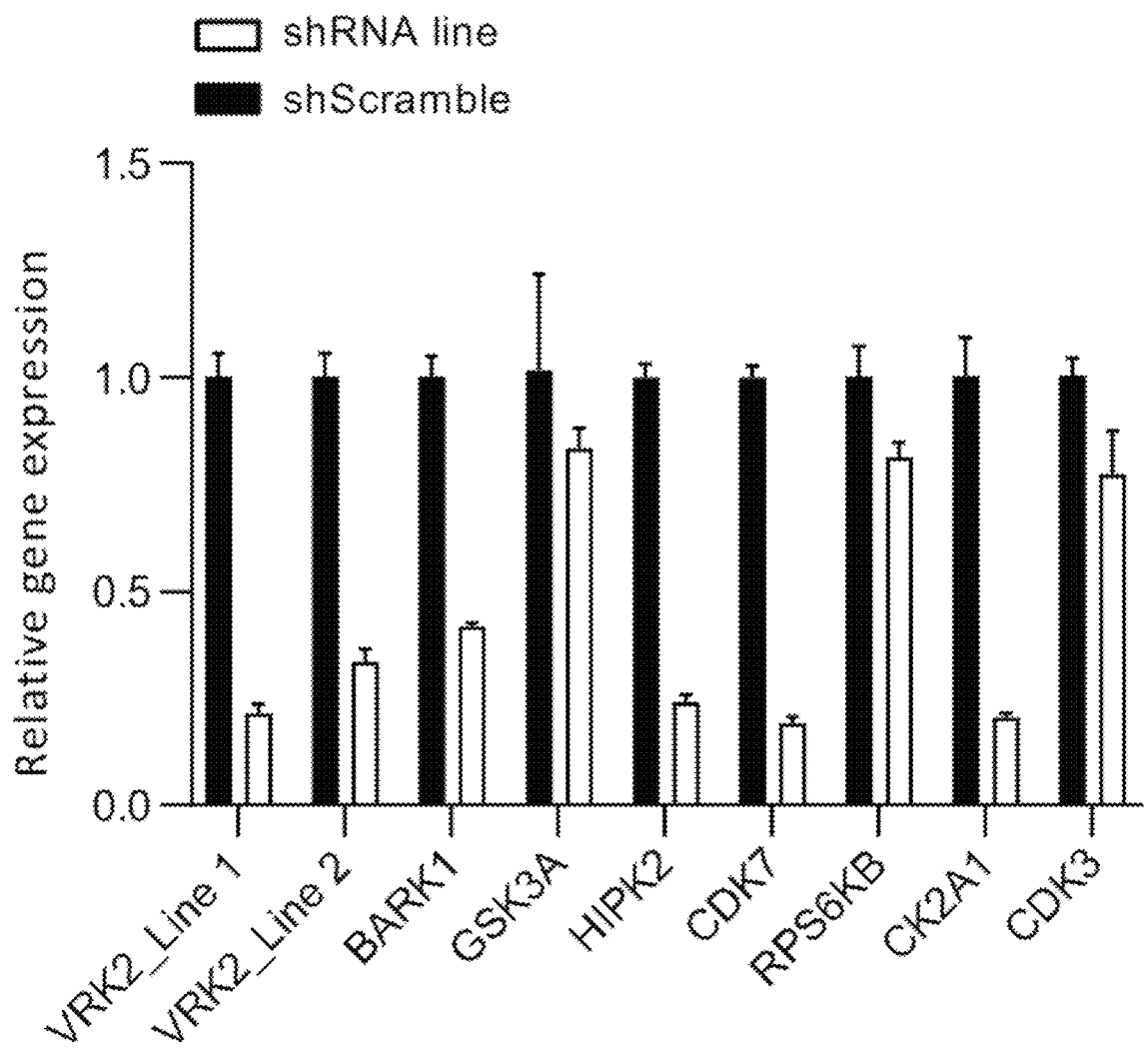
FIG. 4A is a graph of an exemplary kinase knockdown providing an exemplary RT-qPCR analysis for kinase expression and shRNA knockdown efficiency of the indicated kinases in Jurkat T cells.
Figure 4B:
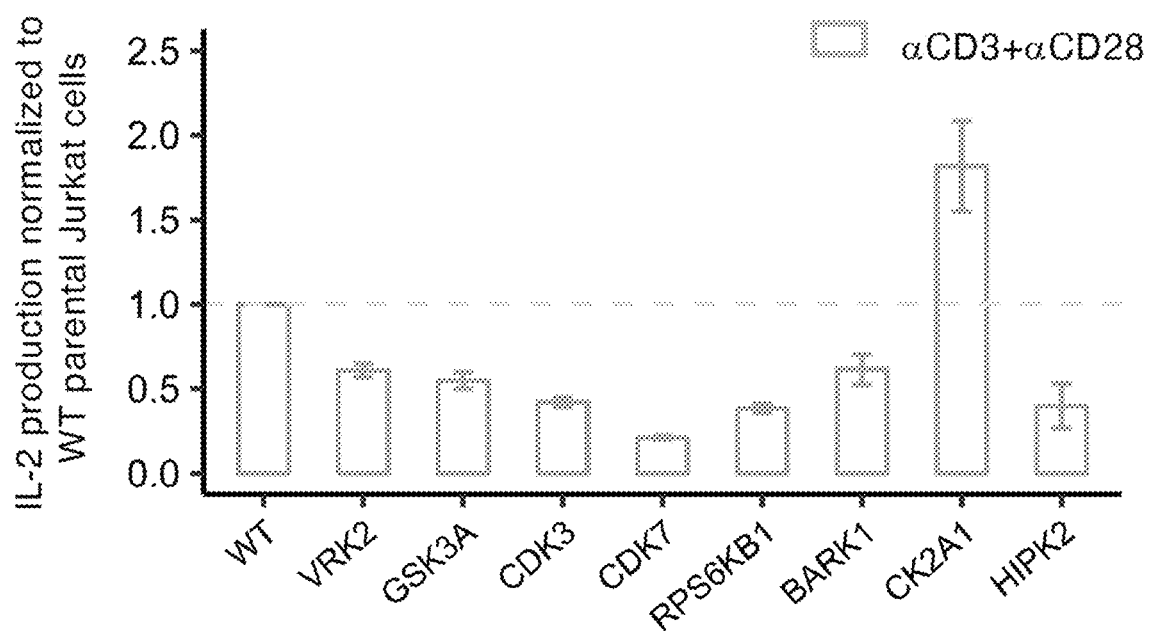
FIG. 4B is a graph of the exemplary kinase knockdown providing IL-2 production from shRNA stable knockdown Jurkat T cells lines.
Figure 5D:
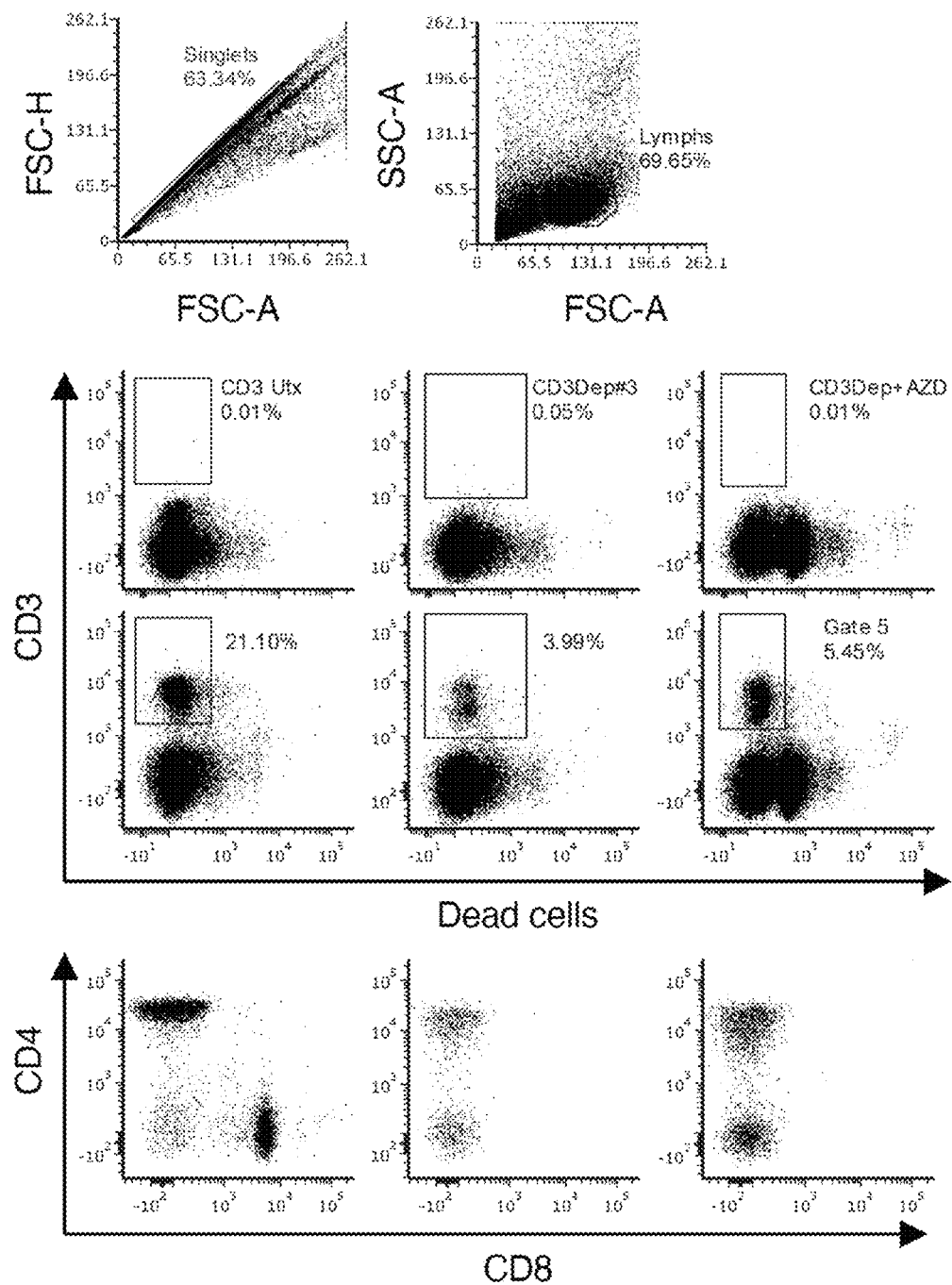
FIG. 5D is a set of graphs of the viability and T cell phenotypic analysis, which illustrate an exemplary flow cytometry validation of CD4 and CD8 T cell depletion, with gating strategy being provided focusing on singlets, lymphocytes, live cells, CD3, and then CD8 and CD4. Data from a representative experiment is shown.
Figures 10A, 10B:
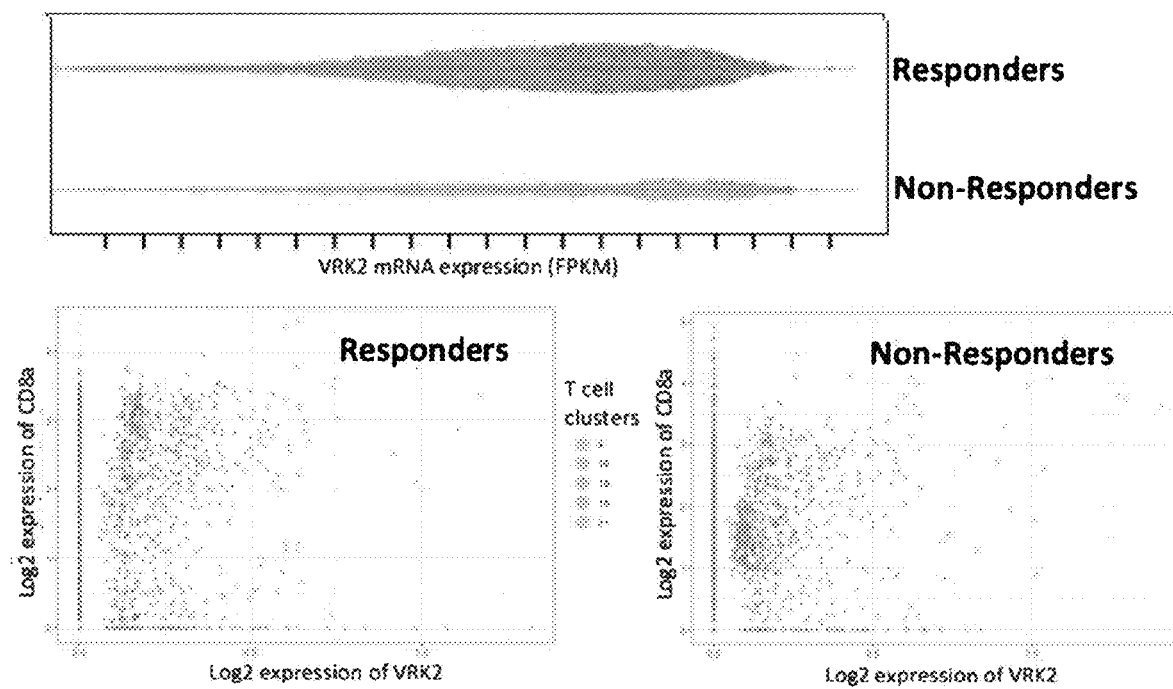
FIGS. 10A and 10B are exemplary graphs showing higher levels of VRK2 in patients that do not respond to PD-1 blockade. Preliminary single cell RNAseq analysis of peripheral CD8 T cells of cancer patients treated with PD-1 blockade done using iCellR package reveals not just higher levels of VRK2 in the non-responders (FIG. 10A), and also association with different T cell subset clusters (FIG. 10B): 2,985 cells of 5 clusters (4, 16, 18, 19, 21) pooled from 14 patients are shown, with the distribution of the CD8 cells that express VRK2 is not the same between the responders and the non-responders to anti-PD-1 treatment.

Exemplary Prediction Analysis of PD-1 Phosphoproteome identifies VRK2 as Potential Downstream Effector The phosphoproteome of PD-1-activated T cells was analyzed and motif prediction analysis and database search were carried out for known substrates to determine which kinases phosphorylated proteins that were significantly differentially phosphorylated following PD-1 ligation (see, e.g., Reference 11). To validate if the predicted kinases mediate signaling downstream of PD-1, shRNA knockdown Jurkat T cell lines of the most represented kinases were generated by lentiviral transduction of kinase-specific shRNAs in Jurkat T cell lines (see, e.g., FIG. 4A). All the cell lines produced IL-2 following overnight T cell receptor (TCR) activation with anti-CD3 and anti-CD28 antibodies (see, e.g., FIG. 4B). Next, IL-2 production in response to TCR stimulation in the presence of PD-1 ligation was measured to determine the consequences of kinase knockdown on PD-1 function (see, e.g., FIG. 1A). Interestingly, compared to the parental Jurkat T cells, the VRK2 knockdown cells were the least susceptible to PD-1 mediated inhibition of IL-2 production (see, e.g., FIG. 1A). Moreover, VRK2, a serine-threonine kinase, was predicted to phosphorylate 26% of all differentially phosphorylated serine and threonine substrates downstream of PD-1 (see, e.g., FIG. 1).

Example 1

VRK2 can be Required for PD-1 Mediated Inhibition of Cytokine Secretion

To determine whether VRK2 knockdown abrogates primary T cell responses to PD-1 ligation, human primary T cells were transfected with siRNA targeting VRK2 and similarly to Jurkat T cells, PD-1 ligation was not able to efficiently inhibit IL-2 (see, e.g., FIG. 2A), IFN-γ (see, e.g., FIG. 2B), and IL-8 (see, e.g., FIG. 2C) secretion.

The disrupted phosphorylation landscape of proteins involved in immune synapse formation following PD-1 ligation and the great proportion of VRK2 targets identified in the kinase screen, suggested that VRK2 may target key proteins regulating the actin cytoskeletal dynamics. Indeed, the phosphoprotemic analysis showed an increase in phosphorylation of PAK2 (see, e.g., Reference 11), a protein involved in cytoskeletal organization, that is a potential target of VRK2 according to the in silico analysis (see, e.g., Reference 11) (see, e.g., FIG. 2D). Therefore, it was sought to validate the in silico predictions in Jurkat T cells with and without pharmacological VRK2 inhibition as well as in shRNA VRK2 knockdown Jurkat T cell line. As demonstrated previously (see, e.g., Reference 11), PD-1 ligation increased S197 phosphorylation of PAK2 but not PAK1 or PAK3 (see, e.g., FIG. 2E), and, as expected, shRNA knockdown of VRK2 as well as pharmacologic inhibition with a VRK2 inhibitor, AZD-7762 (see, e.g., Reference 12), fully inhibited PAK2 S197 phosphorylation following PD-1 ligation (see, e.g., FIGS. 2E and 2F). Collectively, these findings suggest that VRK2 may be a downstream effector of PD-1 signaling, targeting serine and threonine phosphosites.

Example 2

Figure 3A:
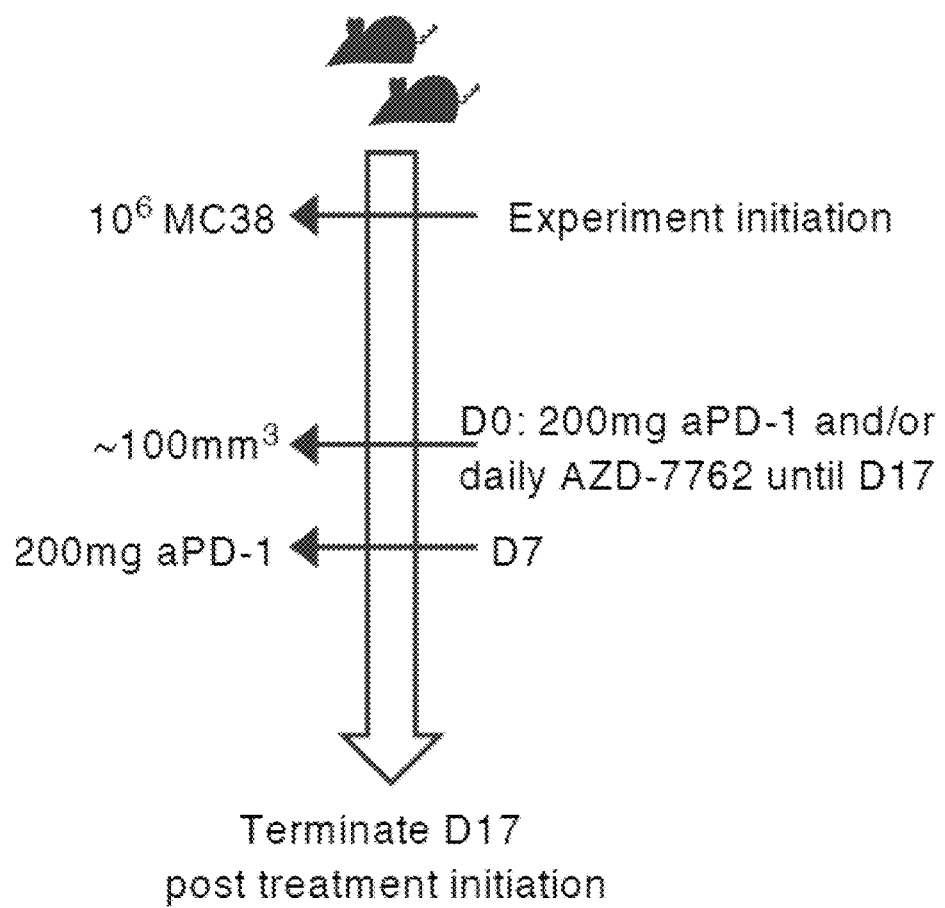
FIG. 3A is an illustration of representation of MC38 mouse tumor protocol when an exemplary VRK2 inhibition synergizes with PD-1 blockade to augment anti-tumor T cell responses.
Figure 3B:
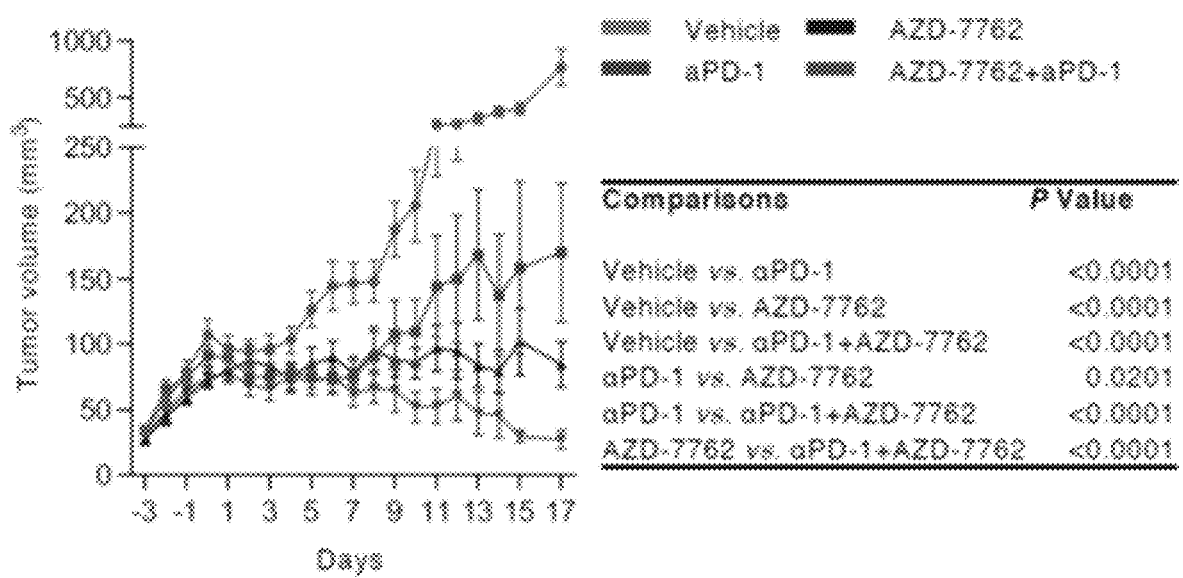
FIG. 3B is a graph of an exemplary MC38 tumor growth curves following administration of the indicated treatments, with the exemplary data representing mean±SEM of tumor volume measured in 9 mice in each condition, from three independent experiments.
Figure 3C:
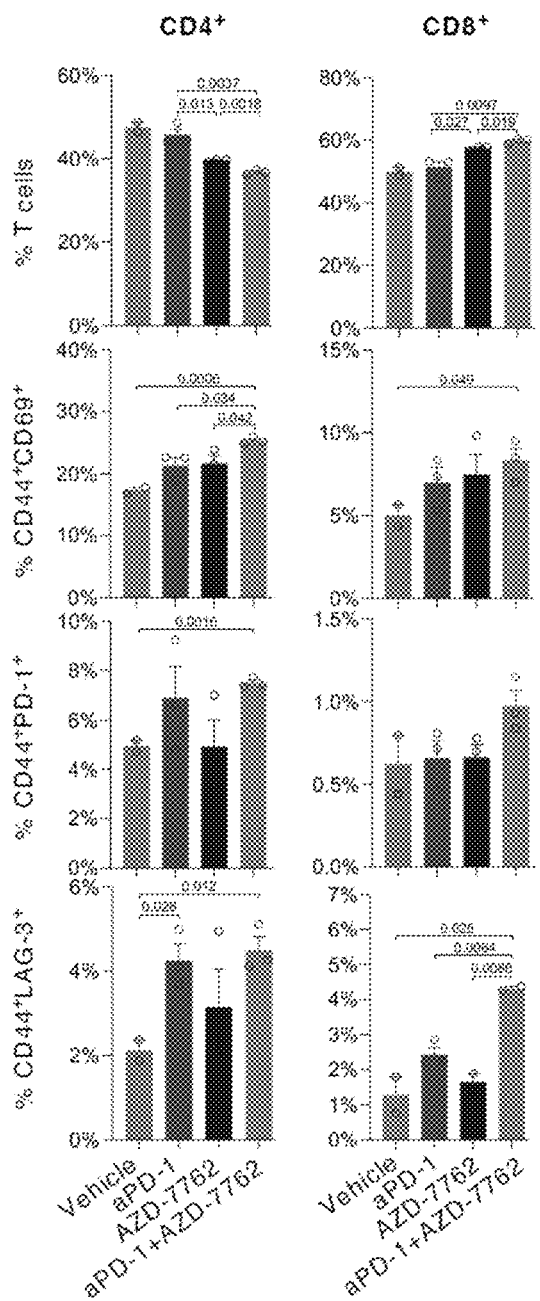
FIG. 3C is a set of exemplary graphs of proportions of CD4 and CD8 T cells in tdLN (lymph nodes) expressing CD69, PD-1, LAG-3 and CD44.

PD-1 Blockade Synergizes with VRK2 Inhibition to Improve Anti-Tumor T Cell Responses Based on the in vitro results, which suggest that VRK2 may be an effector of PD-1 signaling, it was hypothesized that in vivo pharmacologic inhibition of VRK2 may augment T cell responses by directly targeting the PD-1 axis and potentially increasing T cell activation additively with PD-1 blockade in a combination therapy. The MC38 syngeneic mouse tumor model was used to determine whether VRK2 inhibition alone or in combination with PD-1 blockade would improve anti-tumor immune response (see, e.g., FIG. 3A). Since there are no VRK2 specific inhibitors, AZD-7762, a selective inhibitor of both VRK2 and the checkpoint kinases (CHK1 and CHK2) (see, e.g., Reference 12), was used. FIGS. 5A-5D illustrate graphs of viability and T cell phenotypic analysis following treatment with AZD-7762, PF-477736 and Prexasertib. This agent did not cause additional cytotoxicity when cultured in vitro with MC38 cells (see, e.g., FIG. 5A). AZD-7762 treatment alone led to significantly decreased tumor volume compared to vehicle or anti-PD-1 antibody treatment (see, e.g., FIG. 3B). To exclude the possibility that AZD-7762 acts primarily by inhibiting tumor growth via CHK-related mechanism in the tumor cells, tumor growth kinetics was also determined in response to treatment with the two other CHK-specific inhibitors, Prexasertib (LY2606368) (see, e.g., Reference 13) and PF-477,736 (see, e.g., Reference 14). Compared to these drugs, AZD-7762 treatment led to marked decrease in MC38 tumor volume (see, e.g., FIG. 5B) indicating that its activity is not solely mediated via CHK inhibition. Furthermore, the combination of AZD-7762 with PD-1 blockade augmented anti-tumor responses compared to PD-1 blockade alone or AZD-7762 treatment alone (see, e.g., FIG. 3B). This anti-tumor response was consequential to increased proportion of CD8 T cells in tumor draining lymph nodes (tdLN) of treated mice (see, e.g., FIG. 3C). Furthermore, the combination therapy led to significantly increased proportion of activated CD44$^+$CD69$^+$CD4$^+$ and CD8$^+$ T cells in the tdLN, elevated proportion of CD44+PD-1$^+$ T cells in both spleen and tdLN (see, e.g., FIG. 5C), and significantly increased LAG-3$^+$ CD8$^+$ T cells (see, e.g., FIG. 3C). Thus, blocking VRK2 can lead to more activated T cell phenotype.

Figure 3D:
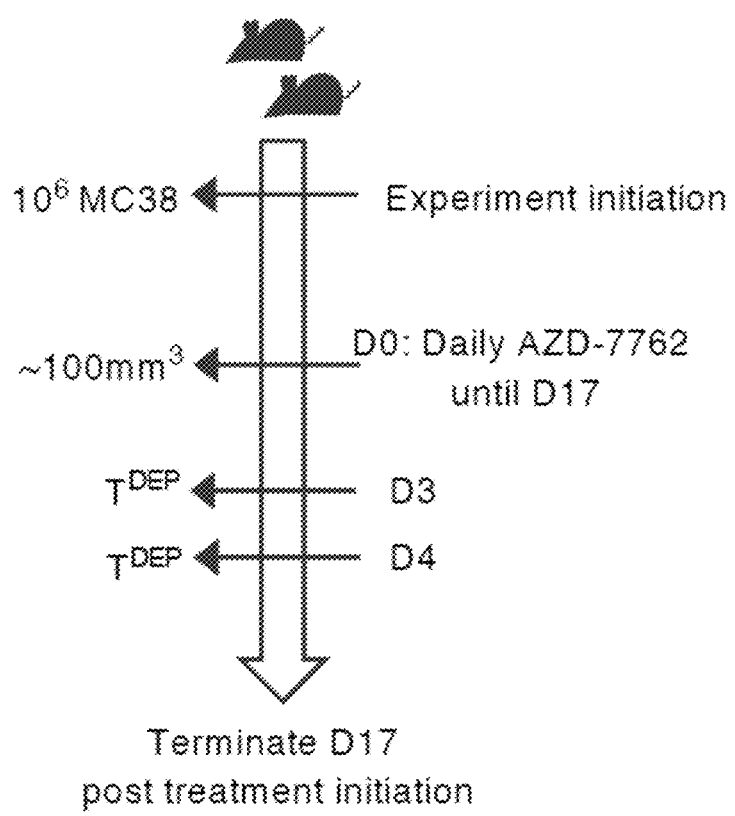
FIG. 3D is an illustration of exemplary CD4$^+$ and CD8$^+$ T cell depletion protocol.
Figure 3G:
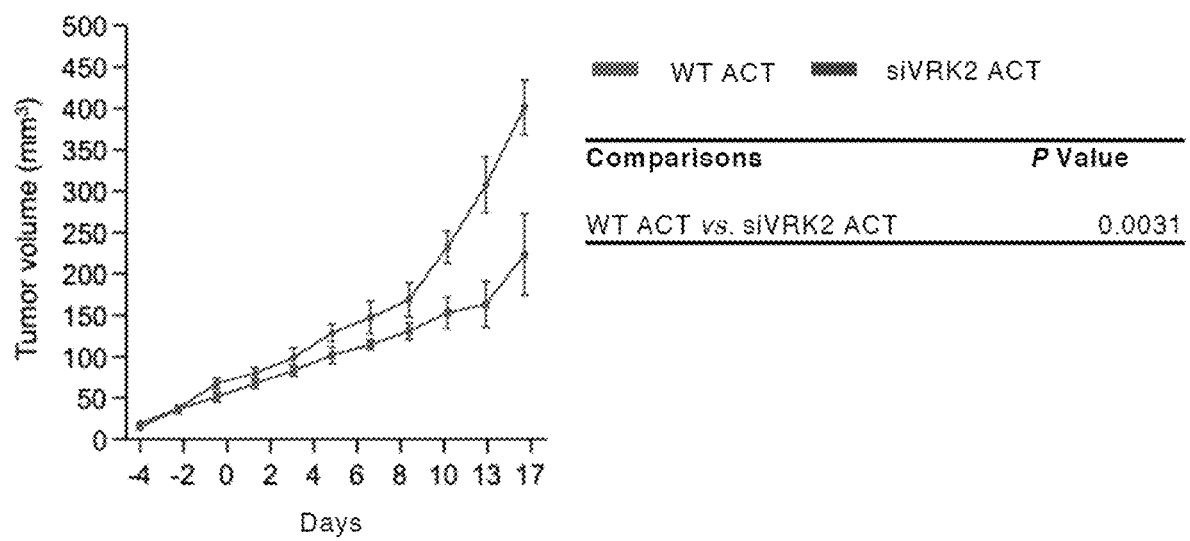
FIG. 3G is a graph of exemplary MC38 tumor growth curves in mice, measured in 3 mice from two independent experiments, comparing the effects of different treatments on tumor volume of FIGS. 3B and 3E by repeated measures two-way ANOVA and Tukey's multiple comparisons test with individual variances computed for each comparison.

Next, it was confirmed that AZD-7762 acts primarily on the T cell compartment to exert its anti-tumor activity. To this end, prior to the AZD-7762 administration, CD4$^+$ and CD8$^+$ T cells (see, e.g., FIG. 5D) were depleted and tumor growth rate (see, e.g., FIG. 3D) was determined. Importantly, T cell depletion fully reversed the anti-tumor activity of AZD-7762, confirming that its therapeutic activity is mediated by the T cell compartment (see, e.g., FIG. 3E). To definitely attribute the limited tumor growth specifically to VRK2 and more directly to T cells, an adoptive cell transfer of wildtype or VRK2 knockout T cells into MC38 tumor bearing wildtype mice was used (see, e.g., FIG. 3F). It was found that transfer of VRK2 deficit T cells alone was sufficient to limit tumor growth (see, e.g., FIG. 3G). These findings reveal VRK2 as potential therapeutic target downstream of PD-1, and suggest that combining PD-1 blockade with VRK2 inhibition can augment anti-tumor T cell responses.

Exemplary Discussion

Reinvigorating T cell-mediated anti-tumor immunity is a prerequisite for the development of successful immunotherapies. Therapeutic blockade of PD-1 has proven to be successful in many cancers (see, e.g., Reference 15). However, not all patients have durable responses to these therapies and a significant proportion of patient experiences immune toxicity (see, e.g., Reference 16), emphasizing the critical role of PD-1 in immune tolerance. To develop more successful therapeutics targeting the PD-1 axis, it is imperative to understand the underlying molecular mechanism and signaling pathways engaged by PD-1. Previously, an unbiased phosphoproteomic screen of PD-1-triggered pathways following ligation with PD-L2 in Jurkat T cells was performed (see, e.g., Reference 11) and revealed multiple molecular tiers of PD-1 regulation, extending beyond the known TCR proximal signaling events. These molecular networks converged into three specific functional groups encompassing leukocyte activation, cellular adhesion and control of gene expression, ultimately leading to attenuated T cell function (see, e.g., Reference 11).

In an attempt to look for potential complementary treatments to PD-1 blockade based on the phosphoproteomic screen, the putative kinases that can phosphorylate PD-1 targeted phosphosites and confirmed their function in vitro was determined. One quarter of the S and T sites were substrates for VRK2. Knockdown of this kinase led to markedly diminished PD-1 inhibition of cytokines secretion, suggesting that VRK2 may act as a downstream effector of PD-1. In fact, the kinase screen predicted that VRK2 mediated PAK2 S197 phosphorylation downstream of PD-1 ligation. These predictions were validated by western blot. It was confirmed that PAK2 5197 is phosphorylated by VRK2 downstream of PD-1. Moreover, pharmacological inhibition of VRK2 augmented the ability of PD-1 blockade to reduce tumor growth. This response was T cell dependent since T cell depletion reversed the anti-tumor activity observed following VRK2 inhibition. Deleting VRK2 specifically in T cells confirmed the role of this kinase in T cell reposes to MC38 tumors.

Certain exemplary embodiments of the present disclosure indicate VRK2 as being a novel downstream effector of PD-1, and provide a method in cancer immunology comprising administering to a subject a VRK2 inhibitor. The concept of double targeting of the same pathway is being evaluated for other pathways in cancer, such as the EGFR pathway, for which a combination of a blocking antibody (Cetuximab) and tyrosine kinase inhibitors are being explored in clinical trials (see, e.g., Reference 17), based on preclinical studies that showed that the combined treatment is additive or even synergistic (see, e.g., Reference 18), probably due to incomplete blocking of the pathway by either agents. Thus, the exemplary results raise the possibility of a dual anti-PD-1 strategy, e.g., involving both a blocking antibody and small molecules.

Example 3

Six versions (different sequences) of shRNA to VRK2, all from the Mission library: TRCN000010207 (GUUGGAUGUACUGGAAUAUAU (SEQ ID NO:18)), TRCN000195058 (CUGGAGGAUUUGGAUUGAUAU (SEQ ID NO:19)), TRCN0000010206 (GGGAAGAAGUUACAGAUUUAU (SEQ ID NO:20)), TRCN0000197178 (GCUCUUCACCGAAAUGUUGUA (SEQ ID NO:21)), TRCN0000010204 (GCCAAACUAUCAAGCCCUCAA (SEQ ID NO:22)) and TRCN0000196878 (GCUCAUAGUUUAGCAUAUGAU (SEQ ID NO:23)) were used to delete VRK2 in Jurkat T cells line that were used to show that lack of ability of PD-1 signaling to inhibit phosphorylation of proteins (pERK and 4G10) using western blots, IL-2 secretion using ELISA, and flow cytometry to measure CD69 expression. The conclusion was that in that absence of VRK2 (using these four shRNA), PD-1 cannot inhibit T cell functions and signaling.

Example 4

IC-261 (AdooQ®: A15764), a small molecule specific inhibitor of VRK2 was used to evaluate the effect of VRK2 inhibition in tumor growth using mice MC38 syngenetic tumor model. This drug was also used in in vitro experiments where the ability of PD-1 to inhibit cytokine secretion was evaluated. The conclusion was that IC-261, through inhibition of VRK2, interfere with PD-1 signaling and function. In a parallel set of experiments, it was confirmed that IC-261 was not toxic to T cells.

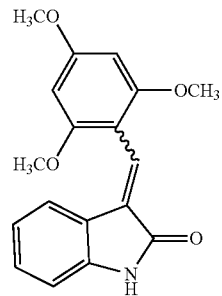

IC-261 Chemical Structure

Figure 11A:
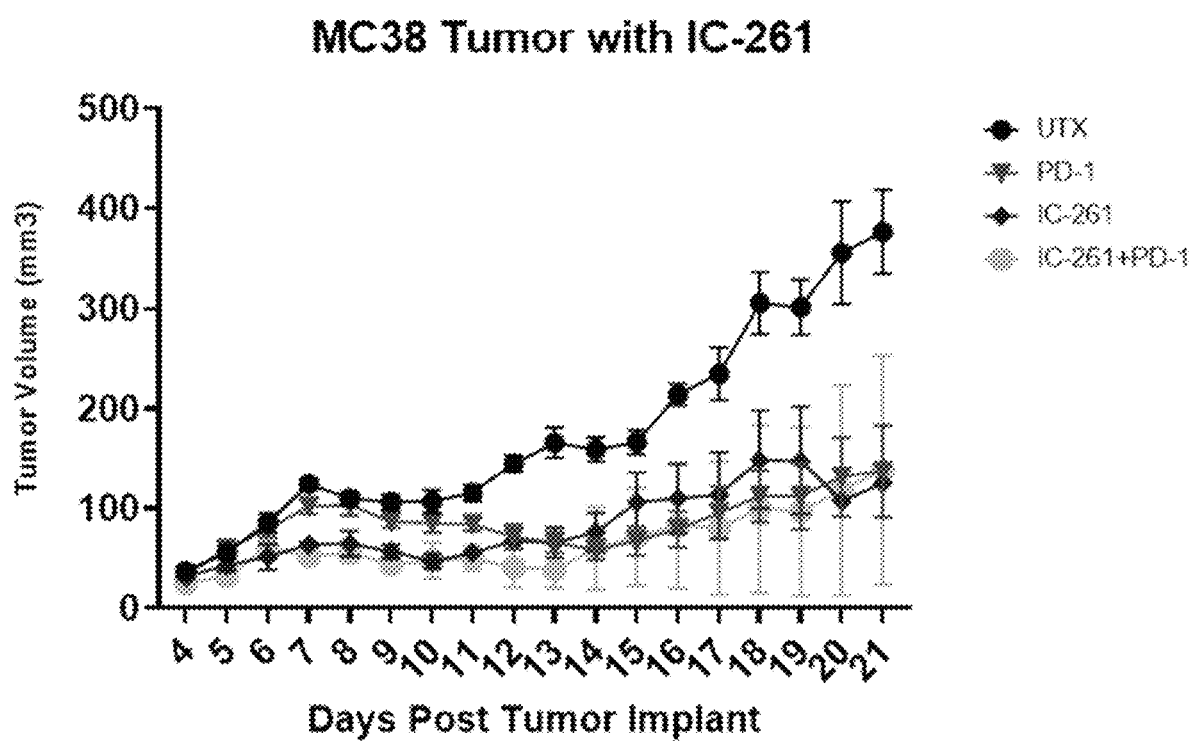
FIG. 11A is a graph illustrating exemplary effects of IC-261 on MC38 tumor.
Figure 11B:
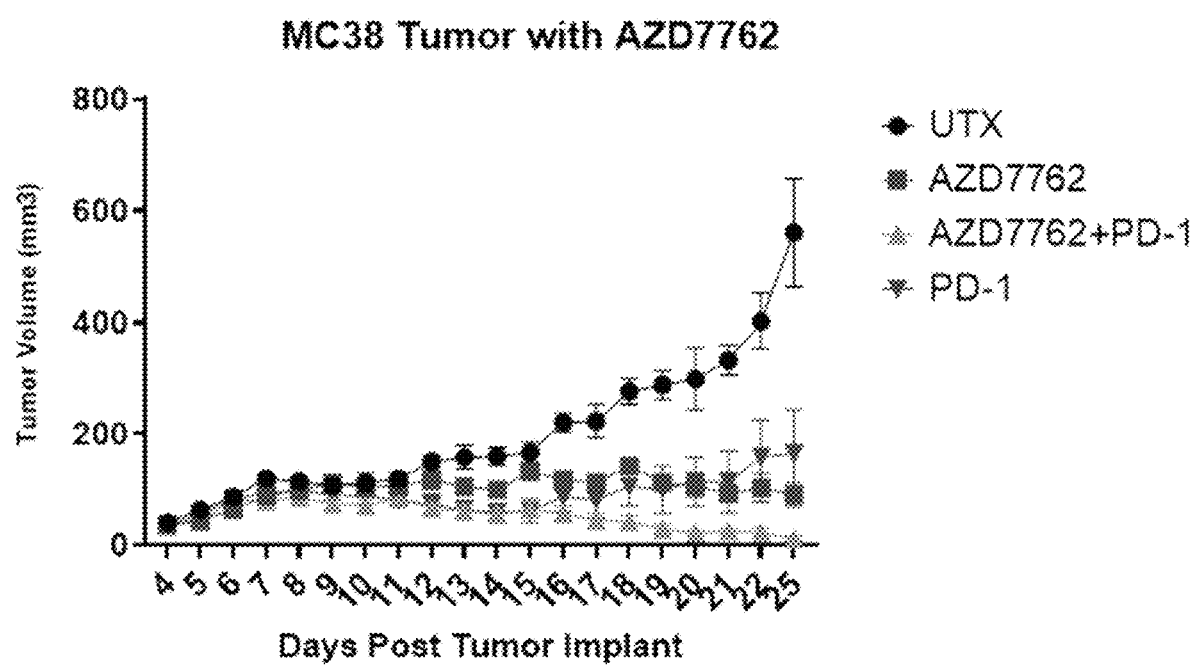
FIG. 11B is a graph illustrating exemplary effects of AZD-7762 on MC38 tumor.

Two VRK2 kinase inhibitors, IC-261 and AZD-7762, were selected for inhibition of VRK2 from a published VRK2 inhibitor screen (Vazquez-Cedeira et al.). Utilizing an immunocompetent syngeneic model, C57BL/6 mice were injected with colon adenocarcinoma cell line MC38 and treated with kinase inhibitors as monotherapy or in combination with a mouse immune checkpoint blocking antibody (clone RMP1.14) for PD-1. Anti-PD-1 monotherapy had a 67% reduction in tumor volume, moreover, AZD-7762 dosed at 25 mg/kg intraperitoneal (I.P.) inhibited tumor growth by ~80% and combination treatment with anti-PD-1 provided significant tumor inhibition of around 90%. IC261 dosed at 5 mg/kg also demonstrated inhibition of tumor growth, like anti-PD-1 dosed as monotherapy (FIGS. 11A and 11B).

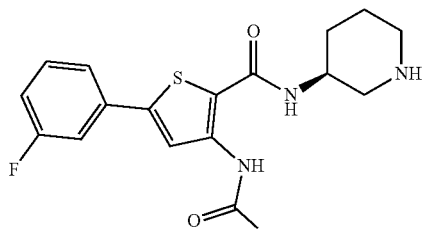

AZD-7762 Chemical Structure

Example 5

Figure 12A:
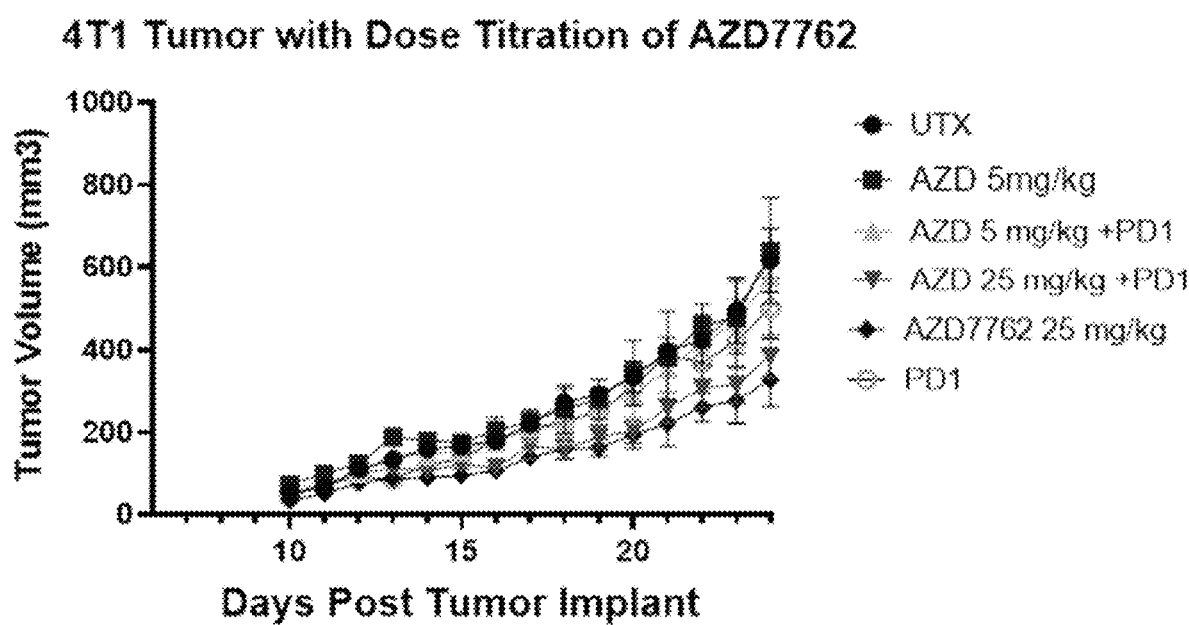
FIG. 12A is a graph illustrating an exemplary dose titration of AZD-7762 in 4T1 tumor.
Figure 12B:
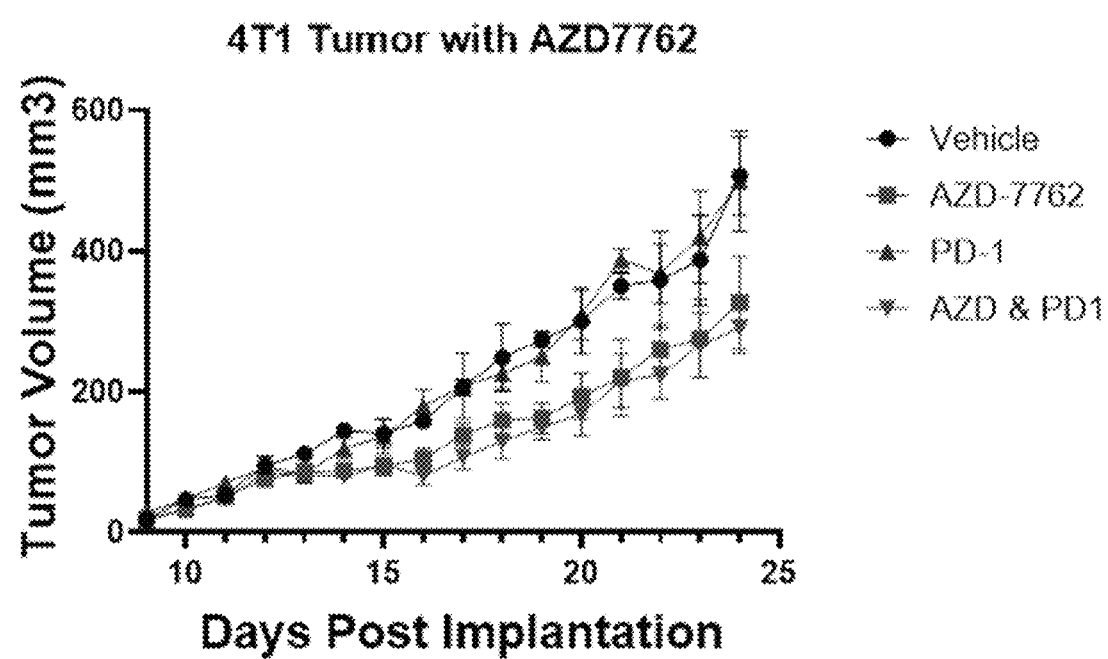
FIG. 12B is a graph illustrating exemplary effects of AZD-7762 on 4T1 tumor.

Interrogating if VRK2 inhibition would inhibit tumors resistant to checkpoint blockade, the mouse breast cancer cell line 4T1 in BALB/c mice was used which is resistant to monotherapy of PD-1 (FIGS. 12A and 12B). Mice treated with AZD-7762 had a reduction in tumor growth (~30%) which was similar to mice treated with the combination of AZD-7762 and anti-PD-1, indicating that the effect was primarily through AZD-7762. To determine if AZD-7762 was mediated by T cells, $CD4^+$ and $CD8^+$ cells were depleted using in vivo antibodies (clone GK1.5 and 2.43 respectively) in MC38 tumor model. Depletion of these cells impaired the efficacy of AZD-7762 demonstrating the dependency on T cells. These results demonstrated the synergy of anti-PD-1 blockade with a VRK2 inhibitor.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings, numbered paragraphs and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following reference is hereby incorporated by references in their entireties:

Dong H, Zhu G, Tamada K, Chen L. B7-H1, a third member of the B7 family, co-stimulates T-cell proliferation and interleukin-10 secretion. *Nature medicine* 1999, 5(12): 1365-1369.

Freeman G J, Long A J, Iwai Y, Bourque K, Chernova T, Nishimura H, et al. Engagement of the PD-1 immunoinhibitory receptor by a novel B7 family member leads to negative regulation of lymphocyte activation. *The Journal of experimental medicine* 2000, 192(7): 1027-1034.

Latchman Y, Wood C R, Chernova T, Chaudhary D, Borde M, Chernova I, et al. PD-L2 is a second ligand for PD-1 and inhibits T cell activation. Nature immunology 2001, 2(3): 261-268.

Tseng S Y, Otsuji M, Gorski K, Huang X, Slansky J E, Pai S I, et al. B7-DC, a new dendritic cell molecule with potent costimulatory properties for T cells. *The Journal of experimental medicine* 2001, 193(7): 839-846.

Peled M, Tocheva A S, Sandigursky S, Nayak S, Philips E A, Nichols K E, et al. Affinity purification mass spectrometry analysis of PD-1 uncovers SAP as a new checkpoint inhibitor. 1i Proceedings of the National Academy of Sciences of the United States of America 2018, 115(3): E468-E477.

Azoulay-Alfaguter I, Strazza M, Pedoeem A, Mor A. The coreceptor programmed death 1 inhibits T-cell adhesion by regulating Rap1. *The Journal of allergy and clinical immunology* 2015, 135(2): 564-567.

Chemnitz J M, Parry R V, Nichols K E, June C H, Riley J L. SHP-1 and SHP-2 associate with immunoreceptor tyrosine-based switch motif of programmed death 1 upon primary human T cell stimulation, but only receptor ligation prevents T cell activation. *Journal of immunology* 2004, 173(2): 945-954.

Hui E, Cheung J, Zhu J, Su X, Taylor M J, Wallweber H A, et al. T cell costimulatory receptor CD28 is a primary target for PD-1-mediated inhibition. *Science* 2017, 355 (6332): 1428-1433.

Patsoukis N, Brown J, Petkova V, Liu F, Li L, Boussiotis V A. Selective effects of PD-1 on Akt and Ras pathways regulate molecular components of the cell cycle and inhibit T cell proliferation. *Science signaling* 2012, 5(230): ra46.

Sheppard K A, Fitz L J, Lee J M, Benander C, George J A, Wooters J, et al. PD-1 inhibits T-cell receptor induced phosphorylation of the ZAP70/CD3zeta signalosome and downstream signaling to PKCtheta. *FEBS letters* 2004, 574(1-3): 37-41.

Tocheva A S, Peled M, Strazza M, Adam K R, Lerrer S, Nayak S, et al. Quantitative phosphoproteomic analysis reveals involvement of PD-1 in multiple T cell functions. *The Journal of biological chemistry* 2020.

Zabludoff S D, Deng C, Grondine M R, Sheehy A M, Ashwell S, Caleb B L, et al. AZD7762, a novel checkpoint kinase inhibitor, drives checkpoint abrogation and potentiates DNA-targeted therapies. *Molecular cancer therapeutics* 2008, 7(9): 2955-2966.

King C, Diaz H B, McNeely S, Barnard D, Dempsey J, Blosser W, et al. LY2606368 Causes Replication Catastrophe and Antitumor Effects through CHK1-Dependent Mechanisms. *Molecular cancer therapeutics* 2015, 14(9): 2004-2013.

Blasina A, Hallin J, Chen E, Arango M E, Kraynov E, Register J, et al. Breaching the DNA damage checkpoint via PF-00477736, a novel small-molecule inhibitor of checkpoint kinase 1. *Molecular cancer therapeutics* 2008, 7(8): 2394-2404.

Masters G A, Krilov L, Bailey H H, Brose M S, Burstein H, Diller L R, et al. Clinical cancer advances 2015: Annual report on progress against cancer from the American Society of Clinical Oncology. *Journal of clinical oncology: official journal of the American Society of Clinical Oncology* 2015, 33(7): 786-809.

Postow M A, Sidlow R, Hellmann M D. Immune-Related Adverse Events Associated with Immune Checkpoint Blockade. *The New England journal of medicine* 2018, 378(2): 158-168.

Subbiah V, Dumbrava E I, Jiang Y, Thein K Z, Naing A, Hong D S, et al. Dual EGFR blockade with cetuximab and erlotinib combined with anti-VEGF antibody bevacizumab in advanced solid tumors: a phase 1 dose escalation triplet combination trial. *Experimental hematology & oncology* 2020, 9: 7.

Huang S, Armstrong E A, Benavente S, Chinnaiyan P, Harari P M. Dual-agent molecular targeting of the epidermal growth factor receptor (EGFR): combining anti-EGFR antibody with tyrosine kinase inhibitor. *Cancer research* 2004, 64(15): 5355-5362.

Marin-Acevedo J A, Kimbrough E O, Lou Y. Next generation of immune checkpoint inhibitors and beyond. J Hematol Oncol. 2021 Mar. 19; 14(1).

Darvin P, Toor S M, Nair V S, Elkord E. Immune checkpoint inhibitors: recent progress and potential biomarkers. Exp Mol Med. 2018 Dec. 13; 50(12): pp. 1-11.

Blanco S, Klimcakova L, Vega F M, Lazo P A. The subcellular localization of vaccinia-related kinase-2 (VRK2) isoforms determines their different effect on p53 stability in tumour cell lines. FEBS J. 2006 June; 273(11): pp. 2487-504.

Serafim et al., Development of Pyridine-based Inhibitors for the Human Vaccinia-related Kinases 1 and 2. ACS Med. Chem. Lett. 2019, 10, 1266-1271.

Vazquez-Cedeira, et al., Differential Inhibitor Sensitivity between Human Kinases VRK1 and VRK2. PLoS ONE, August 2011, 6(8): pp. e23235.

Couñago et al., Structural characterization of human Vaccinia-Related Kinases (VRK) bound to small-molecule inhibitors identifies different P-loop conformations. Scientific Reports, August 2017, 7: 7501.

Michael Peled, et al, VRK2 inhibition synergizes with PD-1 blockade to improve T cell responses, Immunology Letters 233 (2021) 42-47.

Michael Peled, et al, Data on the identification of VRK2 as a mediator of PD-1 function, Data in Brief 37 (2021) 107168.

Ishida Y. PD-1: its discovery, involvement in cancer immunotherapy, and beyond. Cells 2020; 9:1376. PMCID: 7349669.

Pan C, Liu H, Robins E, Song W, Liu D, Li Z, Zheng L. Next-generation immuno-oncology agents: current momentum shifts in cancer immunotherapy. J Hematol Oncol 2020; 13:29. PMCID: 7119170.

Tocheva A S, Peled M, Strazza M, Adam K, Lerrer S, Nayak S, Azoulay-Alfaguter I, Foster C, Philips E A, Neel B G, Ueberheide B, Mor A. Quantitative phosphoproteomic analysis reveals involvement of PD-1 in multiple T cell functions. J Biol Chem 2020; 295:18036-18050. NIHMSID: 1679597.

Peled M, Adam K, Mor A. VRK2 inhibition synergizes with PD-1 blockade to improve T cell responses. Immunol Lett 2021; 2478: 45-6.

Kloog Y, Mor A. Cytotoxic T lymphocyte antigen 4 receptor signaling for lymphocyte adhesion is mediated by C3G and Rap1. Mol Cell Biol 2014; 34:978-88.

Strazza M, Azoulay-Alfaguter I, Dun B, Baquero-Buitrago J, Mor A. CD28 inhibits T cell adhesion by recruiting CAPRI to the plasma membrane. J Immunol 2015; 194: 2871-7.

Azoulay I, Strazza M, Peodeem A, Mor A. The coreceptor PD-1 inhibits T cell adhesion by regulating Rap1. J Allergy Clin Immunol 2015; 135:564-7.

Riley J L. PD-1 signaling in primary T cells. Immunol Rev 2009; 229:114-25. PMCID: 3424066.

Patsoukis N, Wang Q, Strauss L, Boussiotis V A. Revisiting the PD-1 pathway. Sci Adv 2020; 6:eabd2712. PMCID: 7500922.

Peled M, Tocheva A, Sandigursky S, Nayak S, Strazza M, Azulay-Alfaguter I, Philips E A, Askenazi M, Pelzek A, Neel B, Nichols K, Ueberheide B, Mor A. Affinity purification mass spectrometry analysis of PD-1 uncovers SAP as a new checkpoint inhibitor. Proc Natl Acad Sci 2018; 115:468-77. PMCID: 5776966.

Peled M, Verga I E, Ueberheide M, Mor A. EFHD2 is a novel regulator of PD-1 function. J Immunol 2018; 48:2824-31. PMCID: 6200634.

Tocheva A S, Mor A. Checkpoint inhibitors: applications for autoimmunity. Curr Allergy Asthma Rep 2017; 17:72. NIHMSID: 1679600.

Sandigursky S, Silverman G J, Mor A. Targeting the programmed cell death-1 pathway in rheumatoid arthritis. Autoimm Rev 2017; 16:767-773. PMCID: 5596871.

Xu X, Xu J, Wu J, Hu Y, Han Y, Gu Y, Zhao K, Zhang Q, Liu X, Liu J, Liu B, Cao X. Phosphorylation-mediated IFN-γR2 membrane translocation is required to activate macrophage innate response. Cell 2018; 175:1336-1351.

Fan C C, Cheng W C, Huang Y C, Sher Y P, Liou N J, Chien Y C, Lin P S, Lin P S, Chen C H, Chang W C. EFHD2 promotes epithelial-to-mesenchymal transition and correlates with postsurgical recurrence of stage I lung adenocarcinoma. Sci Rep 2017; 7:14617. PMCID: 5668280.

Strazza M, Azoulay-Alfaguter I, Peled M, Adam K, Mor A. Transmembrane adaptor protein PAG is a novel mediator of PD-1 inhibitory signaling in T cells. Comms Bio 2021; 4:672.

Tocheva A, Lerrer S, Mor A. In vitro assays to study PD-1 biology in human T cells. Curr Proto Immunol 2020; 130; e103. NIHMSID: 1679598.

Peled M, Strazza M, Mor A. Co-immunoprecipitation Assay for Studying Functional Interactions Between Receptors and Enzymes. J Vis Exp 2018; 139:58433. PMCID: 6235382.

Dragovich M A, Adam K, Strazza M, Tocheva A S, Peled M, Mor A. SLAMF6 clustering is required to augment T cell activation. PLoS One 2019; 2006:131-140. PMCID: 6568412.

Dragovich M, Mor A. The SLAM family receptors: potential therapeutic targets for inflammatory and autoimmune diseases. Autoimm Rev 2018; 17:674-82. PMCID: 6508580.

Gartshteyn Y, Askanase A D, Mor A. SLAM Associated Protein signaling in T cells: tilting the balance toward autoimmunity. Front Immunol 2021; doi: 10.3389/fimmu.2021.654839.

Hui E, Cheung J, Zhu J, Su X, Taylor M J, Wallweber H A, Sasmal D K, Huang J, Kim J M, Mellman I, Vale R D. T cell costimulatory receptor CD28 is a primary target for PD-1-mediated inhibition. Science 2017; 355:1428-1433. PMCID: 6286077.

Sandigursky S, Philips M R, Mor A. SAP interacts with CD28 to inhibit PD-1 signaling in T lymphocytes. Clin Immunol 2020; 108485. NIHMSID 1602943.

Liu Y, Wang X, Deng L, Ping L, Shi Y, Zheng W, Lin N, Wang X, Tu M, Xie Y, Liu W, Ying Z, Zhang C, Pan Z, Wang X, Ding N, Song Y, Zhu J. ITK inhibition induced in vitro and in vivo anti-tumor activity through down-regulating TCR signaling pathway in malignant T cell lymphoma. Cancer Cell Int 2019; 19:32. PMCID: 6376795.

Strazza M, Straube J, Lerrer S, Adam K, Sandigursky S, Ueberheide B, Mor A. SHP2 targets ITK downstream of PD-1 to inhibit T cell function. Inflammation 2021; doi.org/10.1007/s10753-021-01437-8. NIHMSID: 1679599.

Azoulay-Alfaguter I, Strazza M, Peled M, Novak H, Muller J, Dustin M L, Mor A. The tyrosine phosphatase SHP-1 promotes T cell adhesion by activating the adaptor protein CrkII in the immunological synapse. Sci Signal 2017; 10:eaal2880. NIHMSID: 1679596.

Strazza M, Azoulay-Alfaguter I, Pedoeem A, Mor A. Static adhesion assay for the study of integrin activation in T lymphocytes. J Vis Exp. 2014 Jun. 13; (88):51646.

Kim Y, Hayashi M, Ono T, Yoda T, Takayanagi H, Nakashima T. Suppression of hematopoietic cell kinase ameliorates the bone destruction associated with inflammation. Mod Rheumatol 2020; 30:85-92.

Fernindez I F, Blanco S, Lozano J, Lazo P A. VRK2 inhibits mitogen-activated protein kinase signaling and inversely correlates with ErbB2 in human breast cancer. Mol Cell Biol. 2010 October; 30(19):4687-97. PMCID: 2950518.

Lee J, Lee S, Ryu Y J, Lee D, Kim S, Seo J Y, Oh E, Paek S H, Kim S U, Ha C M, Choi S Y, Kim K T. Vaccinia-related kinase 2 plays a critical role in microglia-mediated synapse elimination during neurodevelopment. Glia. 2019; 67:1667-1679.

Sanz-Garcia M, López-Sinchez I, Lazo P A. Proteomics identification of nuclear Ran GTPase as an inhibitor of human VRK1 and VRK2 (vaccinia-related kinase) activities. Mol Cell Proteomics 2008; 7:2199-214. PMCID: 2577208.

Blanco S, Sanz-Garcia M, Santos C R, Lazo P A. Modulation of interleukin-1 transcriptional response by the interaction between VRK2 and the JIP1 scaffold protein. PLoS One 2008; 3:e1660. PMCID: 2243017.

Blanco S, Santos C, Lazo P A. Vaccinia-related kinase 2 modulates the stress response to hypoxia mediated by TAK1. Mol Cell Biol 2007; 27:7273-83 PMCID: 2168905.

Strazza M, Azoulay-Alfaguter I, Peled M, Mor A. Assay of adhesion under shear stress for the study of T lymphocyte adhesion. J Vis Exp 2016; 112. PMCID: 4993289.

Philips E A, Garcia-Espana A, Tocheva A S, Ahearn I M, Adam K R, Pan R, Mor A, Kong X P. The structural features that distinguish PD-L2 from PD-L1 emerged in placental mammals. J Biol Chem 2020; 295:4372-4380. PMCID: 7135984.

Goebeler M E, Bargou R. Blinatumomab: a CD19/CD3 bispecific T cell engager (BiTE) with unique anti-tumor efficacy. Leuk Lymphoma. 2016 May; 57(5):1021-32. PMID: 27050240.

Lerrer S, Tocheva A S, Bukhari S, Adam K, Mor A. PD-1-stimulated T cell subsets are transcriptionally and functionally distinct. iScience. 2021 Aug. 24; 24(9): 103020. PMID: 34522863.

Vizquez-Cedeira M, Lazo P A. Human VRK2 (vaccinia-related kinase 2) modulates tumor cell invasion by hyper-activation of NFAT1 and expression of cyclooxygenase-2. J Biol Chem. 2012; 287:42739-50. PMCID: 3522273.

Mor A, Campi G, Du G, Zheng Y, Foster D A, Dustin M L, Philips M R. The lymphocyte function-associated antigen-1 receptor costimulates plasma membrane Ras via phospholipase D2. Nat Cell Biol 2007; 9:713-9.

Mor A, Shefler I, Salamon P, Mekori Y A. Characterization of Erk activation in human mast cells stimulated by contact with T cells. Inflammation 2010; 33: 119-25.

Peled M, Strazza M, Mor A. Co-immunoprecipitation assay for studying functional interactions between receptors and enzymes. J Vis Exp 2018; 139: 58433.

Strazza M, Bukhari S M, Tocheva A S, Mor A. PD-1 induced proliferating T cells exhibit a distinct transcriptional signature. Immunology 2021 November; 164(3):555-568. PMID: 34164813.

Lorenz U. SHP-1 and SHP-2 in T cells: two phosphatases functioning at many levels. Immunol Rev. 2009 March; 228(1):342-59. PMID: 19290938.

Martinez-Lim6n A, Joaquin M, Caballero M, Posas F, de Nadal E. The p38 Pathway: From Biology to Cancer Therapy. Int J Mol Sci. 2020 Mar. 11; 21(6):1913. PMID: 32168915.

Mu Y, Liu W J, Bie L Y, Mu X Q, Zhao Y Q. Blocking VRK2 suppresses pulmonary adenocarcinoma progression via ERK1/2/AKT signal pathway by targeting miR-145-5p. Eur Rev Med Pharmacol Sci. 2021 June; 25(11):3933. PMID: 34156669.

Zhu H, Li Q, Zhao Y, Peng H, Guo L, Zhu J, Jiang Z, Zeng Z, Xu B, Chen S. Vaccinia-related kinase 2 drives pancreatic cancer progression by protecting Plk1 from Chfr-mediated degradation. Oncogene. 2021 July; 40(28): 4663-4674. PMID: 34140642.

Shin D S, Zaretsky J M, Escuin-Ordinas H, Garcia-Diaz A, Hu-Lieskovan S, Kalbasi A, Grasso C S, Hugo W, Sandoval S, Torrejon D Y, Palaskas N, Rodriguez G A, Parisi G, Azhdam A, Chmielowski B, Cherry G, Seja E, Berent-Maoz B, Shintaku I P, Le D T, Pardoll D M, Diaz L A Jr, Tumeh P C, Graeber T G, Lo R S, Comin-Anduix B, Ribas A. Primary Resistance to PD-1 Blockade Mediated by JAK1/2 Mutations. Cancer Discov. 2017 February; 7(2):188-201. PMID: 27903500.

Torrejon D Y, Abril-Rodriguez G, Champhekar A S, Tsoi J, Campbell K M, Kalbasi A, Parisi G, Zaretsky J M, Garcia-Diaz A, Puig-Saus C, Cheung-Lau G, Wohlwender T, Krystofinski P, Vega-Crespo A, Lee C M, Mascaro P, Grasso C S, Berent-Maoz B, Comin-Anduix B, Hu-Lieskovan S, Ribas A. Overcoming Genetically Based Resistance Mechanisms to PD-1 Blockade. Cancer Discov. 2020 August; 10(8):1140-1157. PMID: 32467343.

Kalbasi A, Tariveranmoshabad M, Hakimi K, Kremer S, Campbell K M, Funes J M, Vega-Crespo A, Parisi G, Champekar A, Nguyen C, Torrejon D, Shin D, Zaretsky J M, Damoiseaux R D, Speiser D E, Lopez-Casas P P, Quintero M, Ribas A. Uncoupling interferon signaling and antigen presentation to overcome im munotherapy resistance due to JAK1 loss in melanoma. Sci Transl Med. 2020 Oct. 14; 12(565):eabb0152.PMID: 33055240.

Fares C M, Van Allen E M, Drake C G, Allison J P, Hu-Lieskovan S. Mechanisms of Resistance to Immune Checkpoint Blockade: Why Does Checkpoint Inhibitor Immunotherapy Not Work for All Patients? Am Soc Clin Oncol Educ Book. 2019 January; 39:147-164. PMID: 31099674.

Aizman E, Blacher E, Ben-Moshe O, Kogan T, Kloog Y, Mor A Therapeutic effect of farnesylthiosalicylic acid on adjuvant-induced arthritisthrough suppressed release of inflammatory cytokines. Clin Exp Immunol. 2014 March; 175(3):458-67PMID: 24215151.

Wang G, Hu P, Yang J, Shen G, Wu X The effects of PDL-Ig on collagen-induced arthritis. Rheumatol Int. 2011 April; 31(4):513-9.PMID: 20035333.

Tocheva A S, Mor A. Checkpoint Inhibitors: Applications for Autoimmunity. Curr Allergy Asthma Rep. 2017 Sep. 27; 17(10):72. PMID: 28956259.

Wooley P H. Immunotherapy in collagen-induced arthritis: past, present, and future. Am J Med Sci. 2004 April; 327(4):217-26. PMID: 15084918.

Moore A R. Collagen-induced arthritis. Methods Mol Biol. 2003; 225:175-9. PMID: 12769486.

What is claimed is:

1. A method for treating neoplasia in a subject comprising administering to the subject a therapeutically effective amount of a VRK2 (vaccinia-related kinase 2) inhibitor and a therapeutically effective amount of an inhibitor of Programmed cell death receptor-1 (PD-1).

2. The method of claim 1, wherein the subject is a human.

3. The method of claim 1, wherein the neoplasia is a solid tumor or a non-solid (hemopoietic) tumor.

4. The method of claim 2, wherein the neoplasia is a cancer.

5. The method of claim 1, wherein the neoplasia is adenocarcinoma.

6. The method of claim 1, wherein the VRK2 inhibitor comprises at least one of AZD-7762 or a pharmaceutically acceptable salt thereof, IC-261 or a pharmaceutically acceptable salt thereof, siRNA to VRK2, shRNA to VRK2, or a CRISPR/Cas9 targeting VRK2.

7. The method of claim 2, wherein the VRK2 inhibitor comprises AZD-7762 or a pharmaceutically acceptable salt thereof.

8. The method of claim 2, wherein the inhibitor of PD-1 is an anti-PD-1 antibody.

9. The method of claim 6, wherein the VRK2 inhibitor comprises siRNA to VRK2 or shRNA to VRK2.

10. The method of claim 4, wherein the inhibitor of PD-1 is an anti-PD-1 antibody.

11. The method of claim 4, wherein the VRK2 inhibitor comprises at least one of AZD-7762 or a pharmaceutically acceptable salt thereof, IC-261 or a pharmaceutically acceptable salt thereof, siRNA to VRK2, shRNA to VRK2, or a CRISPR/Cas9 targeting VRK2.

12. The method of claim 11, wherein the VRK2 inhibitor comprises siRNA to VRK2 or shRNA to VRK2.

13. The method of claim 6, wherein the subject is a human.

14. The method of claim 2, wherein the PD-1 inhibitor is nivolumab, pembrolizumab, atezolizumab, avelumab, durvalumab, cemiplimab, dostarlimab, saprtalizumab, camrelizumab, sintilimab, toslelizumab, or toripalimab.

15. The method of claim 4, wherein the PD-1 inhibitor is nivolumab, pembrolizumab, atezolizumab, avelumab, durvalumab, cemiplimab, dostarlimab, saprtalizumab, camrelizumab, sintilimab, toslelizumab, or toripalimab.

16. The method of claim 10, wherein the VRK2 inhibitor comprises at least one of AZD-7762 or a pharmaceutically acceptable salt thereof, IC-261 or a pharmaceutically acceptable salt thereof, siRNA to VRK2, shRNA to VRK2, or a CRISPR/Cas9 targeting.

17. The method of claim 14, wherein the VRK2 inhibitor comprises at least one of AZD-7762 or a pharmaceutically acceptable salt thereof, IC-261 or a pharmaceutically acceptable salt thereof, siRNA to VRK2, shRNA to VRK2, or a CRISPR/Cas9 targeting VRK2.

18. The method of claim 15, wherein the VRK2 inhibitor comprises at least one of AZD-7762 or a pharmaceutically acceptable salt thereof, IC-261 or a pharmaceutically acceptable salt thereof, siRNA to VRK2, shRNA to VRK2, or a CRISPR/Cas9 targeting VRK2.

19. The method of claim 17, wherein the VRK2 inhibitor and the inhibitor of PD-1 act synergistically to enhance an anti-neoplasia T-cell immune response in the subject.

20. The method of claim 16, wherein the VRK2 inhibitor and the inhibitor of PD-1 act synergistically to enhance an anti-neoplasia T-cell immune response in the subject.

21. The method of claim 8, wherein the VRK2 inhibitor comprises at least one of AZD-7762 or a pharmaceutically acceptable salt thereof, IC-261 or a pharmaceutically acceptable salt thereof, siRNA to VRK2, shRNA to VRK2, or a CRISPR/Cas9 targeting VRK2.

22. The method of claim 21, wherein the VRK2 inhibitor comprises siRNA to VRK2 or shRNA to VRK2.

23. The method of claim 17, wherein the VRK2 inhibitor comprises siRNA to VRK2 or shRNA to VRK2.

24. The method of claim 21, wherein the VRK2 inhibitor and the inhibitor of PD-1 act synergistically to enhance an anti-neoplasia T-cell immune response in the subject.

25. The method of claim 11, wherein the VRK2 inhibitor and the inhibitor of PD-1 act synergistically to enhance an anti-neoplasia T-cell immune response in the subject.

26. The method of claim 16, wherein the VRK2 inhibitor comprises siRNA to VRK2 or shRNA to VRK2.

27. The method of claim 18, wherein the VRK2 inhibitor and the inhibitor of PD-1 act synergistically to enhance an anti-neoplasia T-cell immune response in the subject.

28. The method of claim 20, wherein the VRK2 inhibitor comprises siRNA to VRK2 or shRNA to VRK2.

29. The method of claim 18, wherein the VRK2 inhibitor comprises siRNA to VRK2 or shRNA to VRK2.

30. The method of claim 5, wherein the adenocarcinoma is colon adenocarcinoma.

31. The method of claim 19, wherein the neoplasia is adenocarcinoma.

32. The method of claim 31, wherein the adenocarcinoma is colon adenocarcinoma.

33. The method of claim 20, wherein the neoplasia is adenocarcinoma.

34. The method of claim 33, wherein the adenocarcinoma is colon adenocarcinoma.

35. The method of claim 23, wherein the neoplasia is adenocarcinoma.

36. The method of claim 35, wherein the adenocarcinoma is colon adenocarcinoma.

\* \* \* \* \*